United States Patent
Lee et al.

(10) Patent No.: US 10,306,611 B2
(45) Date of Patent: May 28, 2019

(54) METHOD FOR ENABLING TERMINAL TO TRANSMIT AND RECEIVE SIGNAL IN WIRELESS COMMUNICATIONS SYSTEM AND APPARATUS THEREFOR

(71) Applicant: LG ELECTRONICS INC., Seoul (KR)

(72) Inventors: Seungmin Lee, Seoul (KR); Hanbyul Seo, Seoul (KR); Hyukjin Chae, Seoul (KR); Daesung Hwang, Seoul (KR); Inkwon Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/770,699

(22) PCT Filed: Mar. 18, 2014

(86) PCT No.: PCT/KR2014/002274
§ 371 (c)(1),
(2) Date: Aug. 26, 2015

(87) PCT Pub. No.: WO2014/148796
PCT Pub. Date: Sep. 25, 2014

(65) Prior Publication Data
US 2016/0007324 A1    Jan. 7, 2016

Related U.S. Application Data

(60) Provisional application No. 61/803,448, filed on Mar. 19, 2013.

(51) Int. Cl.
*H04W 72/04*      (2009.01)
*H04L 5/00*      (2006.01)
(Continued)

(52) U.S. Cl.
CPC ......... *H04W 72/042* (2013.01); *H04L 1/1671* (2013.01); *H04L 5/0055* (2013.01); *H04W 74/006* (2013.01); *H04L 5/0091* (2013.01)

(58) Field of Classification Search
CPC ... H04L 5/0055; H04L 1/1671; H04L 5/0091; H04W 74/006; H04W 72/042; H04W 72/04; H04J 11/00
See application file for complete search history.

(56) References Cited

U.S. PATENT DOCUMENTS

| | | | |
|---|---|---|---|
| 2009/0305698 A1* | 12/2009 | Zhang | H04L 1/0028 455/434 |
| 2012/0182858 A1* | 7/2012 | Nakao | H04L 1/1854 370/216 |

(Continued)

FOREIGN PATENT DOCUMENTS

| | | |
|---|---|---|
| CN | 102412943 A | 4/2012 |
| WO | WO 2011/111955 A2 | 9/2011 |
| WO | WO 2013/029946 A1 | 3/2013 |

OTHER PUBLICATIONS

Alcatel-Lucent Shanghai Bell et al., "Discussion on Signalling Mechanisms for TDD UL-DL Reconfiguration," 3GPP TSG RAN WG1 Meeting #72, R1-130459, St Julian's, Malta, Jan. 28-Feb. 1, 2013, pp. 1-3.

(Continued)

*Primary Examiner* — Lakeram Jangbahadur
(74) *Attorney, Agent, or Firm* — Birch, Stewart, Kolasch & Birch, LLP

(57) ABSTRACT

The present invention relates to a method for enabling a terminal to transmit and receive a signal in a wireless communications system and an apparatus therefor. More specifically, the method includes the steps of: receiving physical downlink shared channel (PDSCH) data and reconfiguration downlink control information (DCI); and trans- (Continued)

mitting at least one of the information of ACK/NACK (acknowledgement/Negative Acknowledgement) for downlink data and the answer message corresponding to the reconfiguration downlink control information, characterized in that the answer message represents whether to succeed in receiving the reconfiguration downlink control information.

6 Claims, 13 Drawing Sheets

(51) Int. Cl.
*H04W 74/00* (2009.01)
*H04L 1/16* (2006.01)

(56) References Cited

U.S. PATENT DOCUMENTS

| | | | | |
|---|---|---|---|---|
| 2012/0207123 | A1* | 8/2012 | Seo | H04L 1/1861 370/329 |
| 2013/0010709 | A1* | 1/2013 | Earnshaw | H04L 5/001 370/329 |
| 2013/0128857 | A1* | 5/2013 | Nakao | H04L 5/001 370/329 |
| 2013/0155969 | A1* | 6/2013 | Moon | H04W 72/042 370/329 |
| 2013/0301490 | A1* | 11/2013 | He | H04W 4/90 370/280 |
| 2014/0119261 | A1* | 5/2014 | Wang | H04W 72/04 370/312 |
| 2014/0233481 | A1* | 8/2014 | Feng | H04L 5/0055 370/329 |
| 2015/0085714 | A1* | 3/2015 | Liang | H04L 1/1614 370/280 |

OTHER PUBLICATIONS

LG Electronics, "Discussion on the Signalling Mechanisms for TDD UL-DL Reconfiguration," 3GPP TSG RAN WG1 Meeting #72, R1-130261, St Julian's, Malta, Jan. 28-Feb. 1, 2013, pp. 1-3.
New Postcom, "Discussion on Different Signalling Mechanisms for TDD UL-DL Reconfiguration," 3GPP TSG RAN WG1 Meeting #72, R1-130163, St Julian's, Malta, Jan. 28-Feb. 1, 2013, pp. 1-5.
Samsung, "False Alarm Handling in UL-DL Reconfiguration," 3GPP TSG RAN WG1 #72, R1-130292, St Julian's, Malta, Jan. 28-Feb. 1, 2013, pp. 1-3.

* cited by examiner

FIG. 2
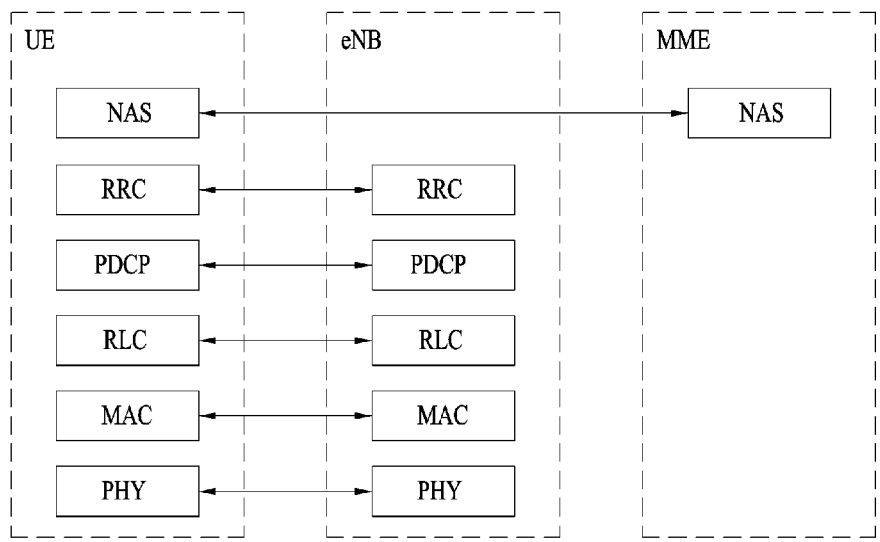
(a) Control-plane protocol stack
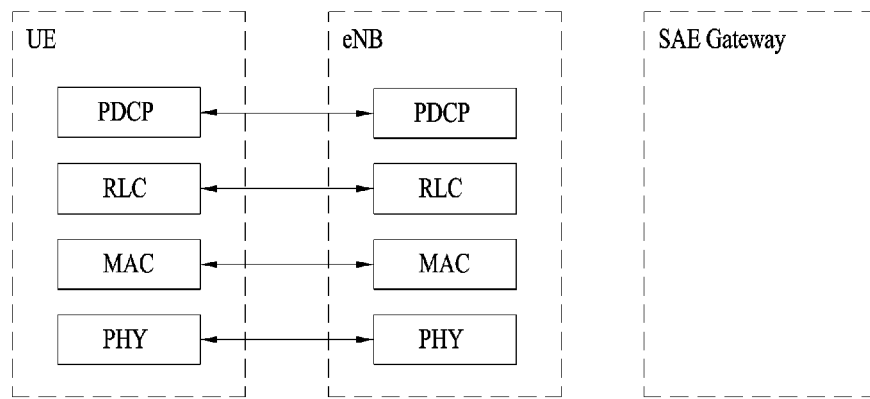
(b) User-plane protocol stack FIG. 7
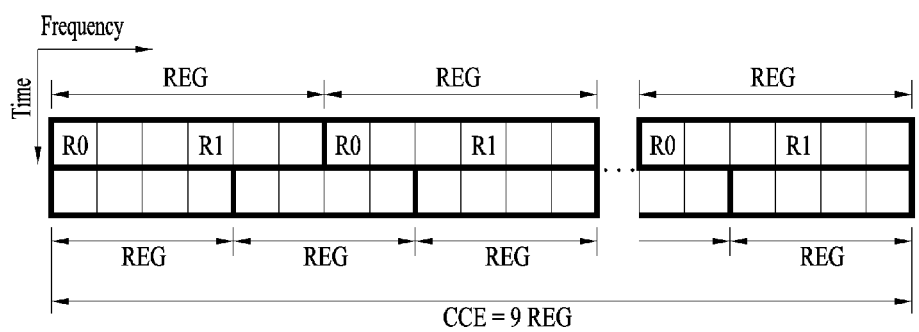
(a) 1TX or 2TX
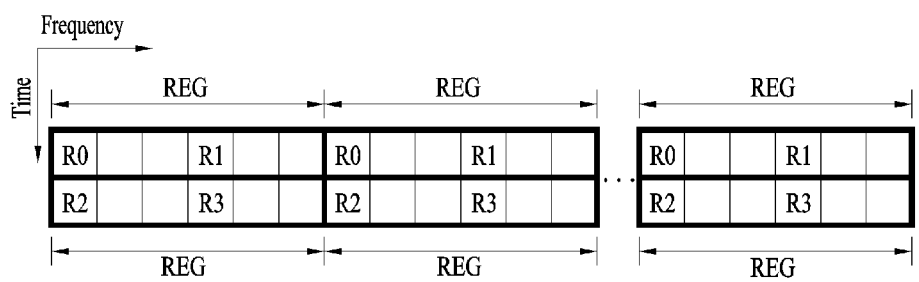
(b) 4 TX

METHOD FOR ENABLING TERMINAL TO TRANSMIT AND RECEIVE SIGNAL IN WIRELESS COMMUNICATIONS SYSTEM AND APPARATUS THEREFOR

CROSS REFERENCE TO RELATED APPLICATIONS

This application is the National Phase of PCT/KR2014/002274 filed on Mar. 18, 2014, which claims priority under 35 U.S.C. 119(e) to U.S. Provisional Application No. 61/803,448 filed on Mar. 19, 2013, all of which are hereby expressly incorporated by reference into the present application.

TECHNICAL FIELD

The present invention relates to a wireless communication system, and more particularly, to a method for a user equipment to transmit and receive signals in a wireless communication system and apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE OF THE INVENTION

Technical Task

The technical task of the present invention is to provide a method for a user equipment to transmit and receive information on whether to receive usage change information in a wireless communication system and apparatus therefor.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In a $1^{st}$ technical aspect of the present invention, provided herein is a method of transceiving signals, in a user equipment of a wireless communication system, including the steps of receiving downlink data (physical downlink shared channel, PDSCH) and a reconfiguration downlink control information (reconfiguration DCI) and transmitting at least one of an ACK/NACK (acknowledgement/negative acknowledgement) information in response to the downlink data and a confirmation message in response to the reconfiguration downlink control information, wherein the confirmation message indicates success or failure in receiving the reconfiguration downlink control information.

Preferably, the ACK/NACK information is transmitted based on a channel selection scheme. More preferably, if the confirmation message and the ACK/NACK information are transmitted in a same subframe, the confirmation message is bundled with the ACK/NACK information. More preferably, the confirmation message is bundled with an ACK/NACK information corresponding to a codeword transmitted in a predefined specific downlink subframe. More preferably, if the confirmation message and the ACK/NACK information are transmitted in the same subframe, the confirmation message is considered to indicate ACK/NACK in response to the downlink data. Further preferably, the subframe having the ACK/NACK information transmitted therein is determined based on a lowest control channel element index of a control channel related to the downlink data and the control channel corresponds to either PDCCH (physical downlink control channel) or EPDCCH (enhanced PDCCH).

More preferably, if the downlink data is transmitted in form of a single codeword, the confirmation message may be transmitted using an uplink resource interconnected to the downlink data only.

More preferably, if the confirmation message is transmitted through an uplink resource differently configured depending on ACK/NACK in response to the downlink data.

More preferably, the ACK/NACK information in response to the downlink data is bundled and the confirmation message is transmitted through an uplink resource configured depending on the bundled ACK/NACK information.

More preferably, if the number of downlink subframes interconnected to a specific uplink subframe is equal to or greater than 3, the confirmation message is transmitted through an uplink resource interconnected to a lowest control channel element index in case of a downlink assignment index (DAI) field of a DCI format set to 3 or 4.

Preferably, the ACK/NACK information is transmitted based on a PUCCH format 3.

Preferably, the ACK/NACK information is transmitted based on PUSCH (physical uplink shared channel).

In a $2^{nd}$ technical aspect of the present invention, provided herein is a user equipment, which transceives signals in a wireless communication system, including a radio frequency unit and a processor configured to receive downlink data (physical downlink shared channel, PDSCH) and a reconfiguration downlink control information (reconfiguration DCI), the processor configured to transmit at least one of an ACK/NACK (acknowledgement/negative acknowledgement) information in response to the downlink data and a confirmation message in response to the reconfiguration downlink control information, wherein the confirmation message indicates success or failure in receiving the reconfiguration downlink control information.

Advantageous Effects

According to the present invention, a user equipment can efficiently transmit and receive information on whether to receive usage change information in a wireless communication system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a diagram for structures of control and user planes of a radio interface protocol between a user equipment and E-UTRAN based on 3GPP radio access network standard.

FIG. 7 is a diagram of a resource unit used to configure a downlink control channel in LTE system.

BEST MODE FOR INVENTION

Figure 1:
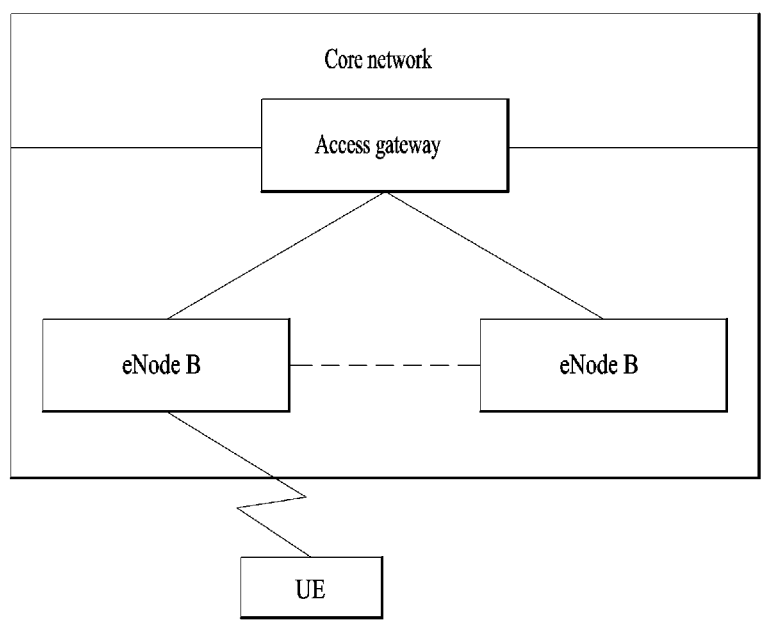
FIG. 1 is a schematic diagram of E-UMTS network structure as one example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
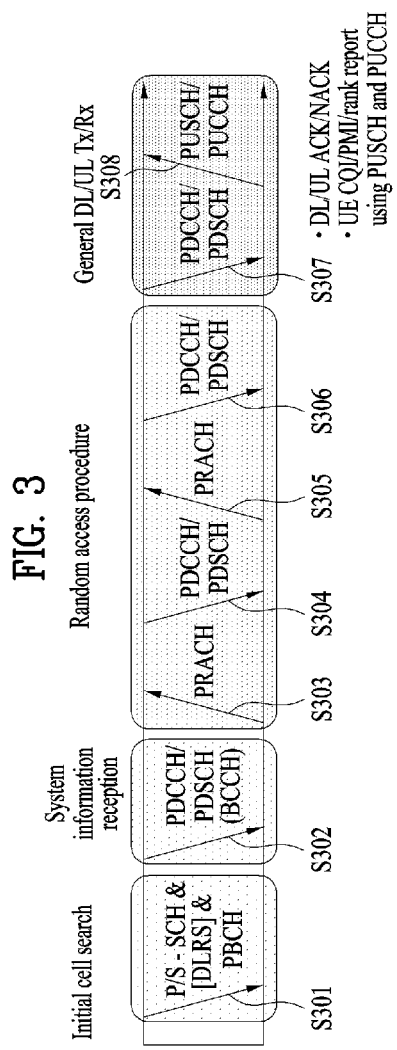
FIG. 3 is a diagram of physical channels used for 3GPP LTE system and a general method of transmitting a signal using the same.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
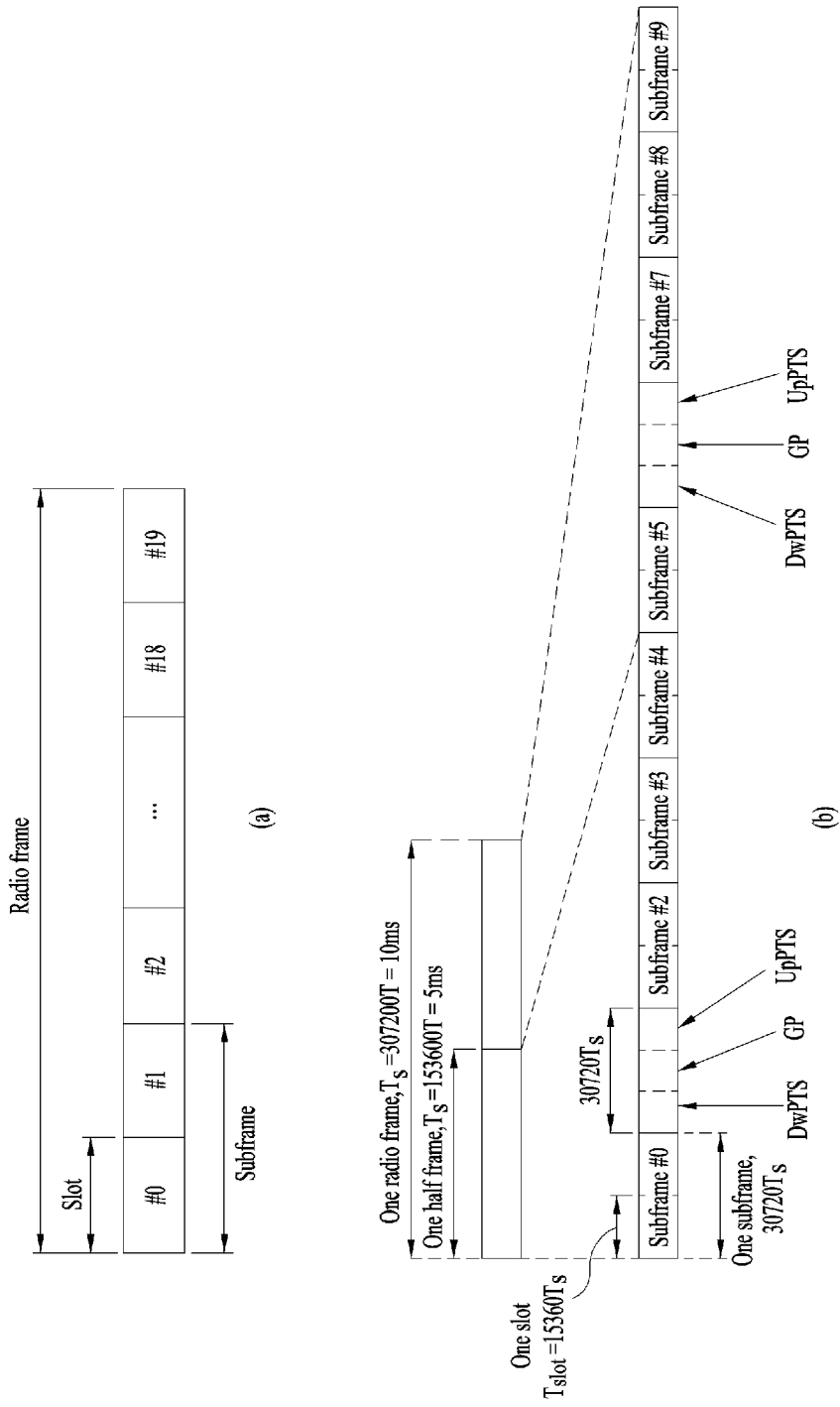
FIG. 4 is a diagram for a structure of a radio frame used in LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000\times2048)$, and the other region is configured for the guard period.

TABLE 1

| | | Normal cyclic prefix in downlink | | Extended cyclic prefix in downlink | | |
| --- | --- | --- | --- | --- | --- | --- |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
| --- | --- | --- | --- | --- | --- | --- | --- | --- | --- | --- | --- |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
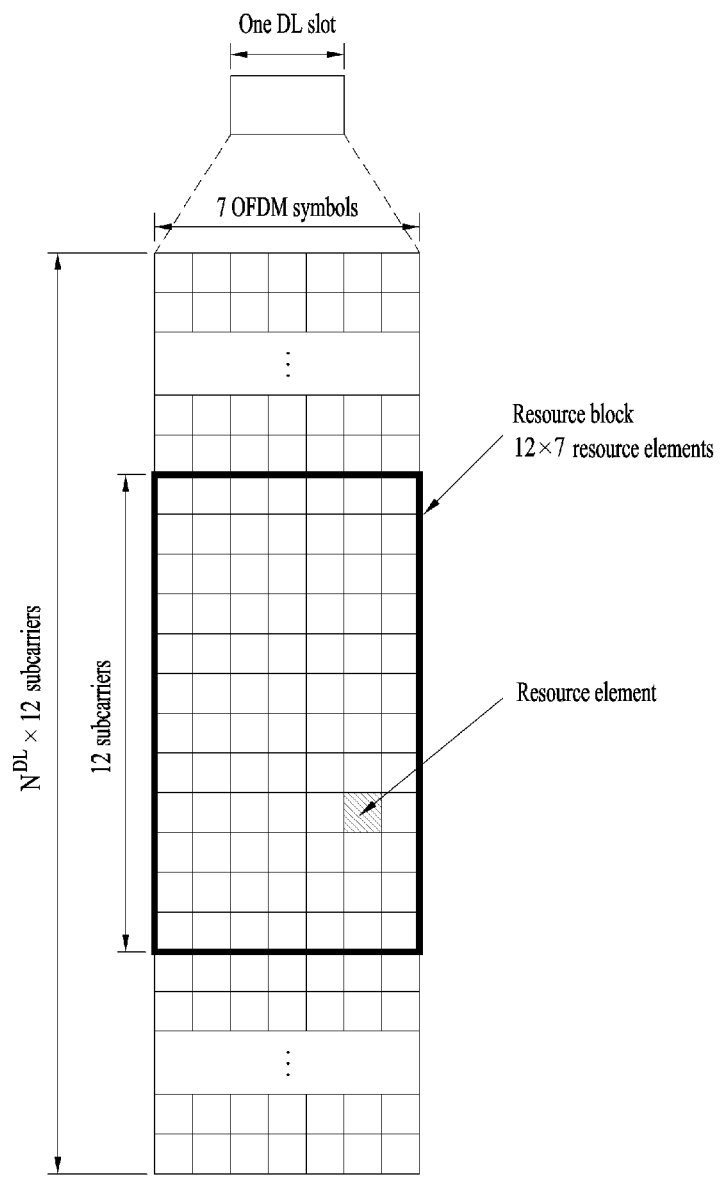
FIG. 5 is a diagram of a resource grid for a downlink slot.

FIG. 5 is a diagram illustrating a resource grid of a downlink slot.

Referring to FIG. 5, the downlink slot includes a plurality of $N_{symb}^{DL}$ OFDM symbols in a time domain and a plurality of $N_{RB}^{DL}$ resource blocks in a frequency domain. Since each resource block includes $N_{sc}^{RB}$ subcarriers, the downlink slot includes $N_{RB}^{DL} \times N_{sc}^{RB}$ subcarriers in the frequency domain. Although FIG. 5 illustrates that the downlink slot includes seven OFDM symbols and the resource block includes twelve subcarriers, it is to be understood that the downlink slot and the resource block are not limited to the example of FIG. 5. For example, the number of OFDM symbols included in the downlink slot may be varied depending on the length of the CP.

Each element on the resource grid will be referred to as a resource element (RE). One resource element is indicated by one OFDM symbol index and one subcarrier index. One RB includes $N_{symb}^{DL} \times N_{sc}^{RB}$ number of resource elements. The number $N_{RB}^{DL}$ of resource blocks included in the downlink slot depends on a downlink transmission bandwidth configured in the cell.

Figure 6:
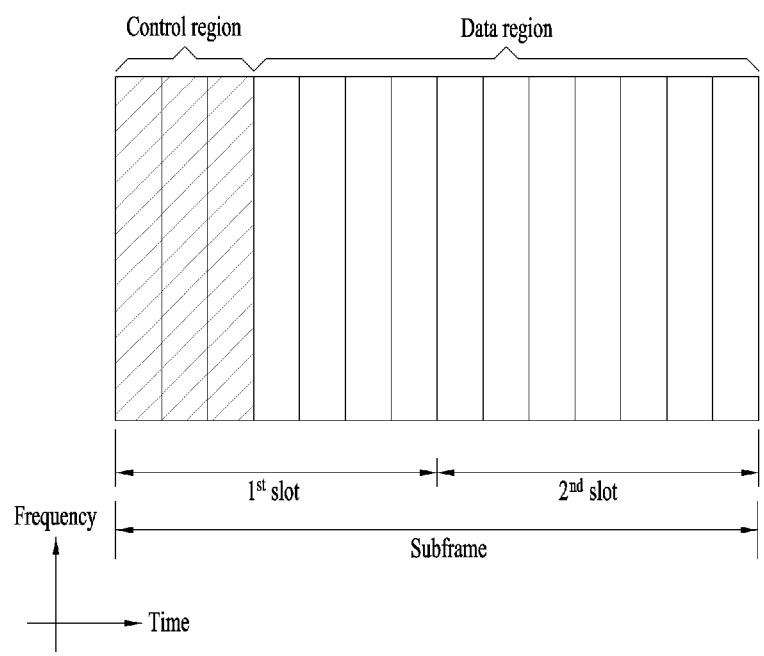
FIG. 6 is a diagram for an example of a structure of a downlink subframe.

FIG. 6 is a diagram illustrating a structure of a downlink subframe.

Referring to FIG. 6, maximum three (four) OFDM symbols located at the front of the first slot of the subframe correspond to a control region to which a control channel is allocated. The other OFDM symbols correspond to a data region to which a physical downlink shared channel (PDSCH) is allocated. Examples of downlink control channels used in the LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK (Hybrid Automatic Repeat reQuest acknowledgement/negative-acknowledgement) signals in response to uplink transmission.

The control information transmitted through the PDCCH will be referred to as downlink control information (DCI). The DCI includes resource allocation information for a user equipment or user equipment group. For example, the DCI includes uplink/downlink scheduling information, uplink transmission (Tx) power control command, etc.

The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the number of CCEs. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

FIG. 7 is a diagram of a resource unit used to configure a downlink control channel in LTE system. Particularly, FIG. 7 (a) shows a case that the number of transmitting antennas of a base station corresponds to 1 or 2 and FIG. 7 (b) shows a case that the number of the transmitting antennas of the base station corresponds to 4. Depending on the number of the transmitting antennas, a reference signal (RS) pattern varies but a method of configuring a resource unit related to a control channel is not changed.

Referring to FIG. 7, a basic resource unit of a downlink control channel corresponds to a resource element group (REG). The REG is constituted with 4 neighbor resource elements (REs) in a state that RS is excluded. The REG is shown as a bold line in the drawing. PCFICH and PHICH include 4 REGs and 3 REGs, respectively. PDCCH is composed of a unit of CCE (control channel element) and a single CCE includes 9 REGs.

A user equipment is configured to check $M^{(L)}(\geq L)$ of CCEs, which are consecutive or arranged according to a specific rule, in order to check whether PDCCH constituted with L of CCEs is transmitted to the corresponding user equipment. The L, which the user equipment needs to consider for PDCCH reception, may have a plurality of values. A set of CCEs, which needs to be checked by the UE for the PDCCH reception, is called a search space. For instance, a search space is defined as Table 3 in LTE system.

TABLE 3

| | Search space $S_k^{(L)}$ | | Number of PDCCH |
| --- | --- | --- | --- |
| Type | Aggregation level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In Table 3, CCE aggregation level 1 indicates the number of CCEs included in the PDCCH, $S_k^{(L)}$ indicates a search space of the CCE aggregation level L, and $M^{(L)}$ indicates the number of PDCCH candidates, which should be monitored in the search space of the CCE aggregation level L.

The search space may be categorized into a UE-specific search space granting an access to a specific user equipment only and a common search space granting accesses to all user equipments in a cell. A user equipment monitors a common search space having a CCE aggregation level set to 4 or 8 and a UE-specific search space having a CCE aggregation level set to 1, 2, 4 or 8. And, the common search space and the UE-specific search space may overlap with each other.

A position of a 1$^{st}$ CCE (i.e., CCE having a smallest index) in PDCCH search space given to a random user equipment for each CCE aggregation level value may vary in each subframe according to a user equipment. This may be called a PDCCH search space hashing.

The CCE may be distributed on a system band. More particularly, a plurality of CCEs logically contiguous to one another are inputted to an interleaver. In this case, the interleaver plays a role in mixing a plurality of the inputted CCEs by REG unit. Hence, frequency/time resources constructing one CCE are distributed in a manner of being physically scattered on an entire frequency/time domain within a control region of a subframe. Although a control channel is configured by CCE unit, interleaving is performed by the REG unit. Therefore, it may be able to maximize frequency diversity and interference randomization gain.

Figure 8:
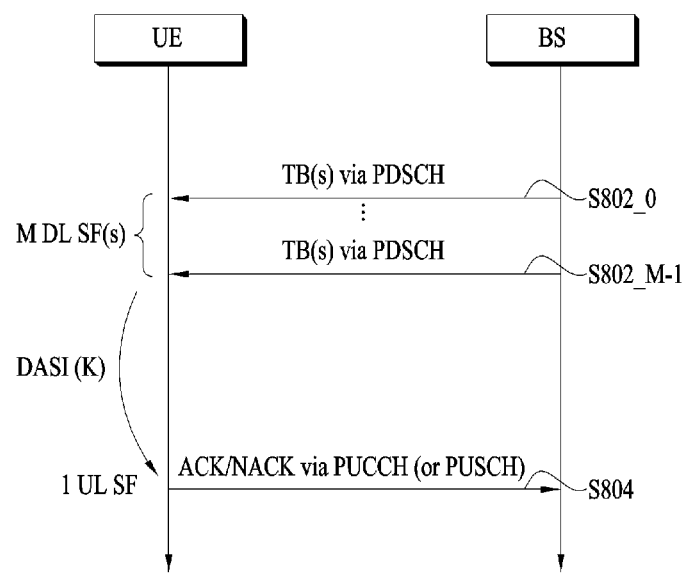
FIG. 8 is a diagram of a process for TDD UL ACK/NACK (uplink acknowledgement/negative acknowledgement) transmission in a single cell environment.

FIG. 8 is a diagram of a process for TDD UL ACK/NACK transmission in a single cell environment.

Referring to FIG. 8, a user equipment may receive at least one DL transmission (e.g., PDSCH signal) in M of DL subframes (SFs) [S802_0 to S802_M−1]. Each PDSCH signal is used to transmit one or more (e.g. 2) transport blocks (TBs) (or codewords (CWs)) according to transmission mode. Moreover, although not shown in the drawing, a PDCCH signal requiring ACK/NACK response, for example, a PDCCH signal indicating SPS release (simply, SPS release PDCCH signal) may also be received in steps S802_0 to S802_M−1. If the PDSCH signal and/or the SPS release PDCCH signal is present in the M of the DL subframes, the user equipment transmits ACK/NACK through one UL subframe corresponding to the M of the DL subframes via processes for transmitting ACK/NACK (e.g. ACK/NACK (payload) generation, ACK/NACK resource allocation, etc.) [S804]. The ACK/NACK includes acknowledgement information on the PDSCH signal and/or the SPS release PDCCH signal in the steps S802_0 to S802_M−1. Although the ACK/NACK is basically transmitted through PUCCH, the ACK/NACK can be transmitted through PUSCH if PUSCH is transmitted at ACK/NACK transmission timing. Various types of PUCCH formats can be used for ACK/NACK transmission. Moreover, various kinds of methods such as ACK/NACK bundling and ACK/NACK channel selection can be used to reduce the number of transmitted ACK/NACK bits.

As mentioned in the above description, in case of TDD, the ACK/NACK in response to data received in the M of the DL subframes is transmitted in one UL subframe (i.e. M DL SF(s): 1 UL SF) and a relationship between them is determined by DASI (downlink association set index).

Table 4 shows DASI (K: $\{k_0, k_1, \ldots, k_{M-1}\}$) defined in LTE(-A). Table 4 shows space between a UL subframe transmitting ACK/NACK and a DL subframe related the UL subframe in aspect of the UL subframe. Particularly, in case that PDSCH transmission and/or the SPS release PDCCH is present in a subframe (n−k) (k∈K), a user equipment transmits corresponding ACK/NACK in a subframe n.

TABLE 4

| UL-DL Config- | Subframe n | | | | | | | | | |
|---|---|---|---|---|---|---|---|---|---|---|
| uration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |

TABLE 4-continued

| UL-DL Config- | Subframe n | | | | | | | | | |
|---|---|---|---|---|---|---|---|---|---|---|
| uration | 0 | 1 | 2 | 3 | 4 | 5 | 6 | 7 | 8 | 9 |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In case of TDD operation, the user equipment needs to transmit an ACK/NACK signal in response to at least one DL transmission (e.g., PDSCH) received in the M of the DL SFs in one UL SF. Methods of transmitting ACK/NACK in response to a plurality of DL SFs in one UL SF can be summarized as follows.

1) ACK/NACK bundling: ACK/NACK bits for a plurality of data units (e.g., PDSCH, SPS release PDCCH, etc.) are combined by a logical operation (e.g., logical-AND operation). For instance, if all data units are successfully decoded, a receiving side (e.g., user equipment) transmits an ACK signal. On the other hand, if any of data units is not decoded (detected), the receiving side transmits an NACK signal or no signal.

2) Channel selection: A user equipment receiving a plurality of the data units (e.g. PDSCH, SPS release PDCCH, etc.) occupies a plurality of PUCCH resources for the ACK/NACK transmission. The ACK/NACK response for a plurality of the data units is identified by a combination of PUCCH resources used for actual ACK/NACK transmission and contents (e.g., bit value, QPSK symbol value, etc.) of the transmitted ACK/NACK. The channel selection scheme may be called an ACK/NACK selection scheme or a PUCCH selection scheme.

The channel selection scheme is described in more detail. According to the channel selection scheme, in case that a user equipment receives a plurality of downlink data, the user equipment occupies a plurality of uplink physical channel resources (e.g., PUCCH resources) to transmit a multiplexed ACK/NACK signal. For instance, if a user equipment receives a plurality of PDSCHs, the user equipment may occupy the same number of PUCCH resources using specific CCE of PDCCH indicating each of the PDSCHs. In this case, a multiplexed ACK/NACK signal may be transmitted using a combination of a prescribed PUCCH resource selected from a plurality of the occupied PUCCH resource and a modulated/encoded content to be applied to the selected PUCCH resource.

Table 5 shows an example of a mapping table for channel selection defined in LTE system.

TABLE 5

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |

TABLE 5-continued

| HARQ-ACK(0), HARQ-ACK(1), HARQ-ACK(2), HARQ-ACK(3) | $n_{PUCCH}^{(1)}$ | b(0), b(1) |
|---|---|---|
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | | No transmission |

In Table 5, HARQ-ACK(i) indicates an HARQ ACK/NACK/DTX response of an $i^{th}$ data unit ($0 \le i \le 3$). The HARQ ACK/NACK/DTX includes ACK, NACK, DTX and NACK/DTX. The NACK/DTX indicates the NACK or the DTX. The ACK and the NACK indicated success and failure in decoding of a transport block (equal to a code block) transmitted in PDSCH, respectively. The DTX (discontinuous transmission) indicates failure in PDCCH detection. Maximum 4 PUCCH resources (i.e., $n^{(1)}_{PUCCH,0}$ to $n^{(1)}_{PUCCH,3}$) may be occupied with respect to each of the data units. The multiplexed ACK/NACK is transmitted through one PUCCH resource selected from the occupied PUCCH resources. The $n^{(1)}_{PUCCH,i}$ in Table 5 indicates a PUCCH resource actually used for the ACK/NACK transmission. The b(0)b(1) indicates two bits transmitted through the selected PUCCH resource and is modulated by QPSK scheme. For instance, in case that a user equipment successfully decodes 4 data units, the user equipment transmits (1, 1) to a base station through a PUCCH resource connected to $n^{(1)}_{PUCCH,1}$. Since combinations of PUCCH resources and QPSK symbols are insufficient to represent all available ACK/NACK assumptions, the NACK is coupled with the DTX except some cases (NACK/DTX, N/D).

Figure 9:
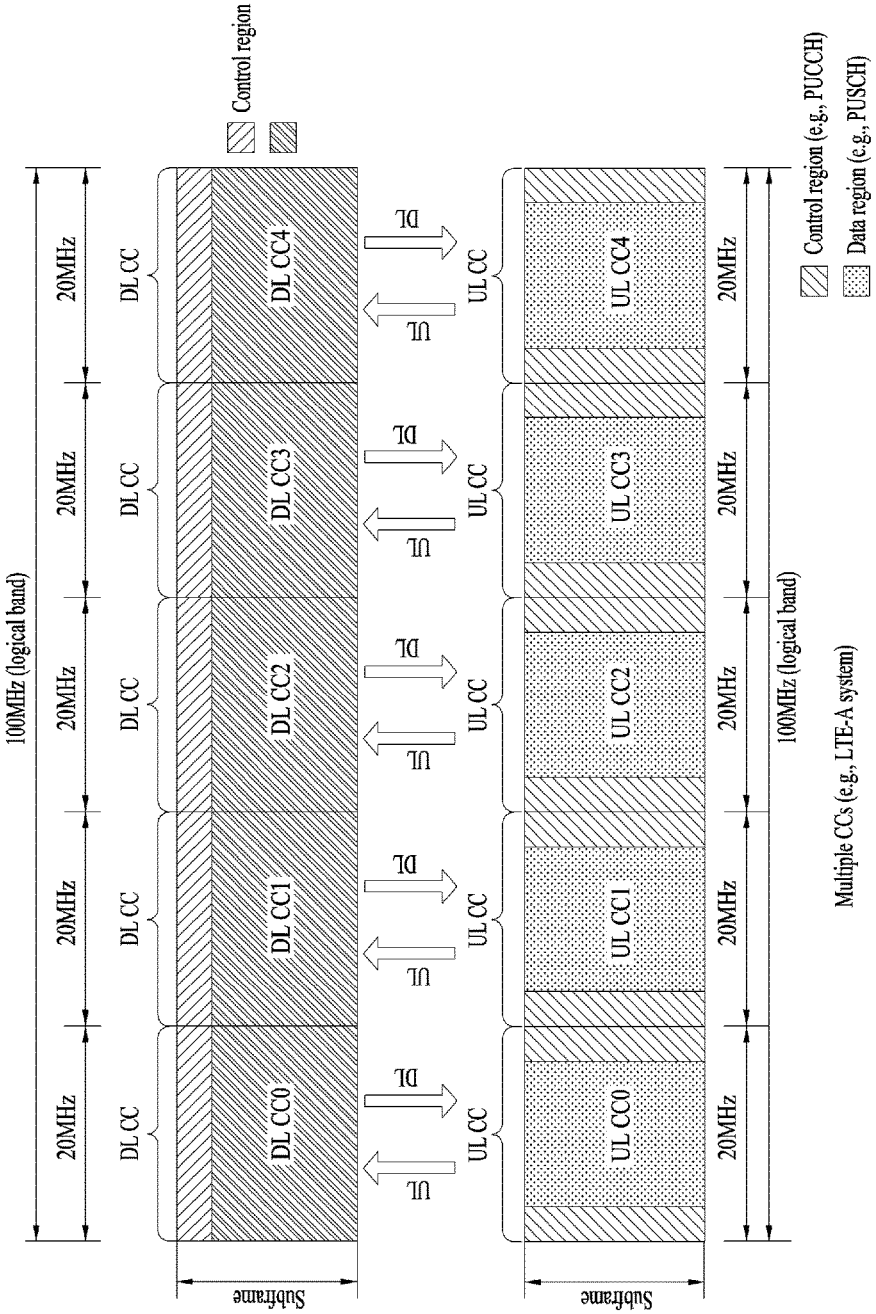
FIG. 9 is a diagram for an example of a carrier aggregation (CA) communication system.

FIG. 9 is a diagram for an example of a carrier aggregation (CA) communication system.

Referring to FIG. 9, it is able to support a wider uplink/downlink bandwidth in a manner of aggregating a plurality of uplink/downlink component carriers (CCs). A terminology "component carrier" can be replaced with a different equivalent terminology (e.g., carrier, cell and the like). Each of a plurality of the CCs can be adjacent or non-adjacent with each other in frequency domain. A bandwidth of each component carrier can be independently determined. An asymmetrical carrier aggregation where the number of UL CC and the number of DL CC are different from each other is also possible. Meanwhile, it is able to configure control information to be transceived on a specific CC only. This sort of specific CC is called a primary CC (or anchor CC) and remaining CC can be called a secondary CC.

If cross-carrier scheduling (or cross-CC scheduling) is applied, PDCCH used for DL allocation is transmitted on a DL CC#0 and corresponding PDSCH can be transmitted on a DL CC#2. For the cross-CC scheduling, an introduction of CIF (carrier indicator field) may be considered. A configuration for presence or non-presence of CIF in PDCCH can be semi-statically and UE-specifically (or UE group-specifically) enabled by upper layer signaling (e.g., RRC signaling). A basic of PDCCH transmission can be summarized as follows.

CIF disabled: PDCCH on DL CC allocates a PDSCH resource on the same DL CC and a PUSCH resource on a solely linked UL CC.
No CIF
CIF enabled: PDCCH on DL CC can allocate a PDSCH or PUSCH resource on a specific DL/UL CC among a plurality of aggregated DL/UL CCs using CIF.
LTE DCI format extended to have CIF
CIF (if configured) is a fixed x-bit field (e.g., x=3).
CIF (if configured) is fixed irrespective of a DCI format size.
LTE PDCCH structure is reused (same encoding, same CCE-based resource mapping.

If CIF exists, a base station can allocate a PDCCH monitoring DL CC set to reduce BD complexity of a user equipment side. The PDCCH monitoring DL CC set is a part of all aggregated DL CCs and includes one or more DL CCs. A user equipment can perform PDCCH detection/decoding on the corresponding DL CC only. In particular, in case that the base station performs PDSCH/PUSCH scheduling on the user equipment, the PDCCH is transmitted only through the PDCCH monitoring DL CC set. The PDCCH monitoring DL CC set may be configured in a UE-specific, UE-group-specific or cell-specific manner. The term "PDCCH monitoring DL CC" may be replaced with equivalent terms such as monitoring carrier, monitoring cell and the like. In addition, aggregated CC for a user equipment may be replaced with equivalent terms such as serving CC, serving carrier, serving cell and the like.

Figure 10:
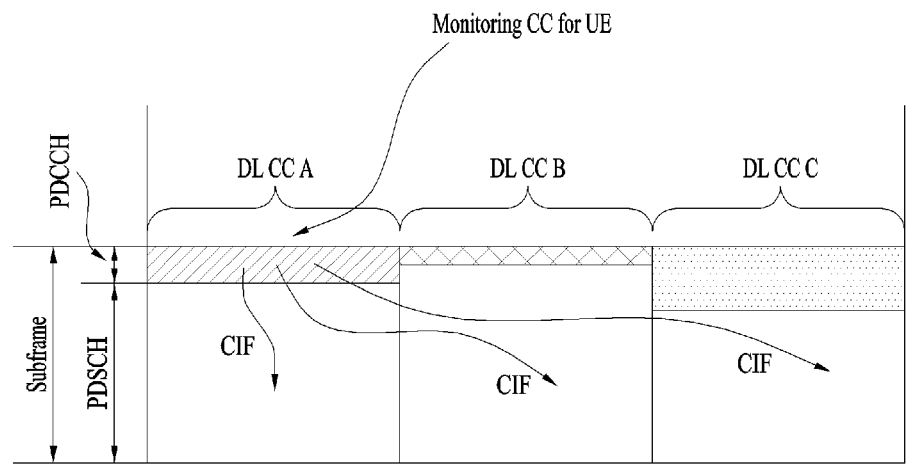
FIG. 10 is a diagram for an example of scheduling in case of a plurality of carriers aggregated.

FIG. 10 is a diagram for an example of scheduling in case of a plurality of carriers aggregated. It is assumed that 3 DL CCs are aggregated and DL CC A is set to a PDCCH monitoring DL CC. DL CC A, DL CC B and DL CC C may be called serving CCs, serving carriers, serving cells and the like. In case of CIF disabled, each DL CC may transmit only PDCCH that schedules PDSCH of its own without the CIF according to LTE PDCCH configuration. In case that the CIF is enabled by UE-specific (or UE-group-specific or cell-specific) upper layer signaling, the DL CC A (i.e., monitoring DL CC) may transmit not only the PDCCH for scheduling the PDSCH of the DL CC A but also PDCCH for scheduling PDSCH of different DL CC. In this case, no PDCCH is transmitted in the DL CC B and the DL CC C, which are not set to PDCCH monitoring DL CCs. Therefore, the DL CC A (i.e., monitoring DL CC) needs to include a PDCCH search space related to the DL CC A, a PDCCH search space related to the DL CC B, and a PDCCH search space related to the DL CC C together. In the present specification, it is assumed that a PDCCH search space is defined in each carrier.

As mentioned in the foregoing description, use of the CIF in the PDCCH is considered for cross-CC scheduling in LTE-A. Information on whether to use the CIF (i.e., support of a cross-CC scheduling mode or a non-cross-CC scheduling mode) and switching between modes may be may be semi-statically or UE-specifically configured through RRC signaling. After performing the corresponding RRC signaling process, a user equipment may recognize whether the CIF is used in PDCCH to be scheduled for the user equipment.

In the following description, a case that a channel selection scheme using PUCCH format 1b is configured to transmit HARQ-ACK in TDD CA is explained. In conventional LTE-A, assume a case that two serving cells (i.e., PCell and SCell) (or PCC and SCC) having same TDD UL-DL Cfg are aggregated.

First of all, the channel selection scheme using the PUCCH format 1b is described in case that M≤2 in a UL subframe n for HARQ-ACK transmission. In this case, the M corresponds to the number (i.e., the number of DL SFs corresponding to UL SF) of elements in a set K as mentioned with reference to Table 5. In case that M≤2 in the UL subframe n, a user equipment may transmit b(0)b(1) on a PUCCH resource selected from A of PUCCH resources ($n^{(1)}_{PUCCH,i}$) (0≤i≤A−1 and A ⊂ {2, 3, 4}). Particularly, the user equipment transmits an A/N signal in the UL subframe n using the PUCCH format 1b according to Tables 6 to 8. In case that M=1 in the UL subframe n, HARQ-ACK(j) indicates an A/N response for a transport block or SPS release PDCCH related a serving cell c. In this case, if M=1, the transport block, the HARQ-ACK(j) and the A of the PUCCH resources are given according to Table 9. In case that M=2 in the UL subframe n, the HARQ-ACK(j) indicates the A/N response for the transport block or the SPS release PDCCH within DL subframe(s) given by the set K in each serving cell. In this case, if M=2, subframes in each serving cell for the HARQ-ACK(j) and the A of PUCCH resources are given according to Table 10.

Table 6 shows an example of a mapping table for channel selection defined in LTE-A system in case that M=1, A=2 and two CCs having the same UL-DL Cfg are aggregated.

TABLE 6

| HARQ-ACK(0), HARQ-ACK(1) | $n_{PUCCH}^{(1)}$ | b(0)b(1) |
|---|---|---|
| ACK, ACK | $n_{PUCCH,1}^{(1)}$ | 1, 0 |
| ACK, NACK/DTX | $n_{PUCCH,0}^{(1)}$ | 1, 1 |
| NACK/DTX, ACK | $n_{PUCCH,1}^{(1)}$ | 0, 1 |
| NACK, NACK/DTX | $n_{PUCCH,0}^{(1)}$ | 0, 0 |
| DTX, NACK/DTX | | No Transmission |

In Table 6, an implicit PUCCH resource linked with PDCCH (i.e., PCC-PDCCH) for scheduling PCC (or PCell) may be allocated in $n^{(1)}_{PUCCH,0}$. And, an implicit PUCCH resource linked with PDCCH (i.e. SCC-PDCCH) for scheduling SCC or an explicit PUCCH resource reserved through RRC may be allocated in $n^{(1)}_{PUCCH,1}$, according to presence or non-presence of cross-CC scheduling. For instance, in case of the cross-CC scheduling, the implicit PUCCH resource linked with the PCC-PDCCH may be allocated in the $n^{(1)}_{PUCCH,0}$ and the implicit PUCCH resource linked with the SCC-PDCCH may be allocated in the $n^{(1)}_{PUCCH,1}$.

Table 7 shows an example of a mapping table for channel selection defined in LTE-A system in case that M=1, A=3 and two CCs having the same UL-DL Cfg are aggregated.

TABLE 7

| HARQ-ACK(0), HARQ-ACK(1), HARQ-ACK(2) | $n_{PUCCH}^{(1)}$ | b(0)b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 0 |
| ACK, NACK/DTX, ACK | $n_{PUCCH,2}^{(1)}$ | 1, 0 |
| ACK, NACK/DTX, NACK/DTX | $n_{PUCCH,0}^{(1)}$ | 1, 1 |
| NACK/DTX, ACK, ACK | $n_{PUCCH,2}^{(1)}$ | 0, 1 |
| NACK/DTX, ACK, NACK/DTX | $n_{PUCCH,1}^{(1)}$ | 0, 1 |

TABLE 7-continued

| HARQ-ACK(0), HARQ-ACK(1), HARQ-ACK(2) | $n_{PUCCH}^{(1)}$ | b(0)b(1) |
|---|---|---|
| NACK/DTX, NACK/DTX, ACK | $n_{PUCCH,2}^{(1)}$ | 0, 0 |
| NACK, NACK/DTX, NACK/DTX | $n_{PUCCH,0}^{(1)}$ | 0, 0 |
| DTX, NACK/DTX, NACK/DTX | | No Transmission |

In Table 7, in case that the PCC corresponds to MIMO CC and the SCC corresponds to non-MIMO CC, the implicit PUCCH resources linked with the PCC-PDCCH may be allocated to the $n^{(1)}_{PUCCH,0}$ and the $n^{(1)}_{PUCCH,1}$ and the implicit PUCCH resource linked with the SCC-PDCCH or the explicit PUCCH resource reserved through the RRC may be allocated to $n^{(1)}_{PUCCH,2}$ according to presence or non-presence of the cross-CC scheduling. Moreover, in case that the PCC corresponds to the non-MIMO CC and the SCC corresponds to the MIMO CC, the implicit PUCCH resource linked with the PCC-PDCCH may be allocated to the $n^{(1)}_{PUCCH,0}$ and the implicit PUCCH resource linked with the SCC-PDCCH or the explicit PUCCH resource reserved through the RRC may be allocated to the $n^{(1)}_{PUCCH,1}$ and the $n^{(1)}_{PUCCH,2}$ according to presence or non-presence of the cross-CC scheduling.

Table 8 shows an example of a mapping table for channel selection defined in LTE-A system in case that M≤2, A=4 and two CCs having the same UL-DL Cfg are aggregated.

TABLE 8

| HARQ-ACK(0), HARQ-ACK(1), HARQ-ACK(2), HARQ-ACK(3) | $n_{PUCCH}^{(1)}$ | b(0)b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,2}^{(1)}$ | 1, 1 |
| ACK, ACK, NACK/DTX, ACK | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 1, 1 |
| ACK, NACK/DTX, ACK, NACK/DTX | $n_{PUCCH,2}^{(1)}$ | 1, 0 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,1}^{(1)}$ | 0, 0 |
| NACK/DTX, ACK, ACK, NACK/DTX | $n_{PUCCH,2}^{(1)}$ | 0, 1 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| NACK, NACK/DTX, NACK/DTX, NACK/DTX | $n_{PUCCH,0}^{(1)}$ | 0, 0 |
| DTX, NACK/DTX, NACK/DTX, NACK/DTX | | No Transmission |

In Table 8, the implicit PUCCH resource linked with PDCCH for scheduling the PCC (or PCell) may be allocated irrespective of whether to perform the cross-CC scheduling. And, the implicit PUCCH resource linked with PDCCH (i.e., SCC-PDCCH) for scheduling the SCC or the explicit PUCCH resource reserved through RRC may be allocated to the $n^{(1)}_{PUCCH,2}$ and/or $n^{(1)}_{PUCCH,3}$ respectively, according to presence or non-presence of the cross-CC scheduling. For instance, in case that M=2 in a situation of the cross-CC scheduling, an implicit PUCCH resource linked with PCC-PDCCH in a 1$^{st}$ DL SF and an implicit PUCCH resource linked with PCC-PDCCH in a 2$^{nd}$ DL SF may be allocated to the $n^{(1)}_{PUCCH,0}$ and the $n^{(1)}_{PUCCH,1}$, respectively. And, an implicit PUCCH resource linked with SCC-PDCCH in the 1st DL SF and an implicit PUCCH resource linked with SCC-PDCCH in the 2nd DL SF may be allocated to the $n^{(1)}_{PUCCH,2}$ and the $n^{(1)}_{PUCCH,3}$, respectively.

Table 9 shows an example of a transport block, HARQ-ACK(j) and a PUCCH resource in case that M=1.

TABLE 9

| A | HARQ-ACK(0) | HARQ-ACK(1) | HARQ-ACK(2) | HARQ-ACK(3) |
|---|---|---|---|---|
| | | HARQ-ACK(j) | | |
| 2 | TB1 Primary cell | TB1 Secondary cell | NA | NA |
| 3 | TB1 Serving cell1 | TB2 Serving cell1 | TB1 Serving cell2 | NA |
| 4 | TB1 Primary cell | TB2 Primary cell | TB1 Secondary cell | TB2 Secondary cell |

* TB: transport block, NA: not available

Table 10 shows an example of a transport block, HARQ-ACK(j) and a PUCCH resource in case that M=2.

13. In case that M>2 in the UL subframe n, the $n^{(1)}_{PUCCH,0}$ and the $n^{(1)}_{PUCCH,1}$ are related to DL transmission(s) (e.g., PDSCH transmission(s)) on the PCell and the $n^{(1)}_{PUCCH,2}$ and the $n^{(1)}_{PUCCH,3}$ are related to DL transmission(s) (e.g., PDSCH transmission(s)) on the SCell.

Moreover, HARQ-ACK(i) for a random cell means the A/N response for PDCCH (PDSCH corresponding to the PDCCH), which has DAI-c set to i+1, for scheduling the corresponding cell. Meanwhile, in case that PDSCH w/o PDCCH is present, HARQ-ACK(0) may mean the A/N response for the corresponding PDSCH w/o PDCCH and HARQ-ACK(i) may mean the A/N response for PDCCH (PDSCH corresponding to the PDCC) having DAI-c set to i.

Table 11 shows an example of a mapping table for channel selection defined in LTE-A system in case that M=3 and two CCs having the same UL-DL Cfg are aggregated.

TABLE 11

| Primary Cell HARQ-ACK(0), HARQ-ACK(1), HARQ-ACK(2) | Secondary Cell HARQ-ACK(0), HARQ-ACK(1), HARQ-ACK(2) | Resource $n_{PUCCH}^{(1)}$ | Constellation b(0), b(1) | RM Code Input Bits o(0), o(1), o(2), o(3) |
|---|---|---|---|---|
| ACK, ACK, ACK | ACK, ACK, ACK | $n_{PUCCH,1}^{(1)}$ | 1, 1 | 1, 1, 1, 1 |
| ACK, ACK, NACK/DTX | ACK, ACK, ACK | $n_{PUCCH,1}^{(1)}$ | 0, 0 | 1, 0, 1, 1 |
| ACK, NACK/DTX, any | ACK, ACK, ACK | $n_{PUCCH,3}^{(1)}$ | 1, 1 | 0, 1, 1, 1 |
| NACK/DTX, any, any | ACK, ACK, ACK | $n_{PUCCH,3}^{(1)}$ | 0, 1 | 0, 0, 1, 1 |
| ACK, ACK, ACK | ACK, ACK, NACK/DTX | $n_{PUCCH,0}^{(1)}$ | 1, 0 | 1, 1, 1, 0 |
| ACK, ACK, NACK/DTX | ACK, ACK, NACK/DTX | $n_{PUCCH,3}^{(1)}$ | 1, 0 | 1, 0, 1, 0 |
| ACK, NACK/DTX, any | ACK, ACK, NACK/DTX | $n_{PUCCH,0}^{(1)}$ | 0, 1 | 0, 1, 1, 0 |
| NACK/DTX, any, any | ACK, ACK, NACK/DTX | $n_{PUCCH,3}^{(1)}$ | 0, 0 | 0, 0, 1, 0 |
| ACK, ACK, ACK | ACK, NACK/DTX, any | $n_{PUCCH,2}^{(1)}$ | 1, 1 | 1, 1, 0, 1 |
| ACK, ACK, NACK/DTX | ACK, NACK/DTX, any | $n_{PUCCH,2}^{(1)}$ | 0, 1 | 1, 0, 0, 1 |
| ACK, NACK/DTX, any | ACK, NACK/DTX, any | $n_{PUCCH,2}^{(1)}$ | 1, 0 | 0, 1, 0, 1 |
| NACK/DTX, any, any | ACK, NACK/DTX, any | $n_{PUCCH,2}^{(1)}$ | 0, 0 | 0, 0, 0, 1 |
| ACK, ACK, ACK | NACK/DTX, any, any | $n_{PUCCH,1}^{(1)}$ | 1, 0 | 1, 1, 0, 0 |
| ACK, ACK, NACK/DTX | NACK/DTX, any, any | $n_{PUCCH,1}^{(1)}$ | 0, 1 | 1, 0, 0, 0 |
| ACK, NACK/DTX, any | NACK/DTX, any, any | $n_{PUCCH,0}^{(1)}$ | 1, 1 | 0, 1, 0, 0 |
| NACK, any, any | NACK/DTX, any, any | $n_{PUCCH,0}^{(1)}$ | 0, 0 | 0, 0, 0, 0 |
| DTX, any, any | NACK/DTX, any, any | No Transmission | | 0, 0, 0, 0 |

TABLE 10

| A | HARQ-ACK(0) | HARQ-ACK(1) | HARQ-ACK(2) | HARQ-ACK(3) |
|---|---|---|---|---|
| | | HARQ-ACK(j) | | |
| 4 | The first subframe of Primary cell | The second subframe of Primary cell | The first subframe of Secondary cell | The second subframe of Secondary cell |

Secondly, the channel selection scheme using the PUCCH format 1b is described in case that M>2 in the UL subframe n for the HARQ-ACK transmission. Basic matters are equal/similar to those in case that M≤2. Particularly, the user equipment transmits the A/N signal using the PUCCH format 1b in the UL subframe n according to Tables 12 and In Table 11, implicit PUCCH resource linked with the PDCCH (i.e., PCC-PDCCH) for scheduling PCC (or PCell) may be allocated to the $n^{(1)}_{PUCCH,0}$ and/or the $n^{(1)}_{PUCCH,1}$ respectively, irrespective of whether to perform the cross-CC scheduling. And, explicit PUCCH resources reserved through the RRC may be allocated to the $n^{(1)}_{PUCCH,2}$ and/or the $n^{(1)}_{PUCCH,3}$ respectively, according to presence or non-presence of the cross-CC scheduling. For instance, in case of TDD, an implicit PUCCH resource linked with PCC-PDCCH having DAI-C set to 1 and an implicit PUCCH resource linked with PCC-PDCCH having DAI-C set to 2 may be allocated to the $n^{(1)}_{PUCCH,0}$ and the $n^{(1)}_{PUCCH,1}$ respectively. And, an implicit PUCCH resource linked with SCC-PDCCH having DAI-C set to 1 and an implicit PUCCH resource linked with SCC-PDCCH having DAI-C set to 2 may be allocated to the $n^{(1)}_{PUCCH,2}$ and the $n^{(1)}_{PUCCH,3}$ respectively.

Table 13 shows an example of a mapping table for channel selection defined in LTE-A system in case that M=4 and two CCs having the same UL-DL Cfg are aggregated.

TABLE 13

| Primary Cell | Secondary Cell | Resource | Constellation b(0), b(1) | RM Code Input Bits o(0), o(1), o(2), o(3) |
|---|---|---|---|---|
| HARQ-ACK(0), HARQ-ACK(1), HARQ-ACK(2), HARQ-ACK(3) | HARQ-ACK(0), HARQ-ACK(1), HARQ-ACK(2), HARQ-ACK(3) | $n_{PUCCH}^{(1)}$ | b(0), b(1) | o(0), o(1), o(2), o(3) |
| ACK, ACK, ACK, NACK/DTX | ACK, ACK, ACK, NACK/DTX | $n_{PUCCH,1}^{(1)}$ | 1, 1 | 1, 1, 1, 1 |
| ACK, ACK, NACK/DTX, any | ACK, ACK, ACK, NACK/DTX | $n_{PUCCH,1}^{(1)}$ | 0, 0 | 1, 0, 1, 1 |
| ACK, DTX, DTX, DTX | ACK, ACK, ACK, NACK/DTX | $n_{PUCCH,3}^{(1)}$ | 1, 1 | 0, 1, 1, 1 |
| ACK, ACK, ACK, ACK | ACK, ACK, ACK, NACK/DTX | $n_{PUCCH,3}^{(1)}$ | 1, 1 | 0, 1, 1, 1 |
| NACK/DTX, any, any, any | ACK, ACK, ACK, NACK/DTX | $n_{PUCCH,3}^{(1)}$ | 0, 1 | 0, 0, 1, 1 |
| (ACK, NACK/DTX, any, any), except for (ACK, DTX, DTX, DTX) | ACK, ACK, ACK, NACK/DTX | $n_{PUCCH,3}^{(1)}$ | 0, 1 | 0, 0, 1, 1 |
| ACK, ACK, ACK, NACK/DTX | ACK, ACK, NACK/DTX, any | $n_{PUCCH,0}^{(1)}$ | 1, 0 | 1, 1, 1, 0 |
| ACK, ACK, NACK/DTX, any | ACK, ACK, NACK/DTX, any | $n_{PUCCH,3}^{(1)}$ | 1, 0 | 1, 0, 1, 0 |
| ACK, DTX, DTX, DTX | ACK, ACK, NACK/DTX, any | $n_{PUCCH,0}^{(1)}$ | 0, 1 | 0, 1, 1, 0 |
| ACK, ACK, ACK, ACK | ACK, ACK, NACK/DTX, any | $n_{PUCCH,0}^{(1)}$ | 0, 1 | 0, 1, 1, 0 |
| NACK/DTX, any, any, any | ACK, ACK, NACK/DTX, any | $n_{PUCCH,3}^{(1)}$ | 0, 0 | 0, 0, 1, 0 |
| (ACK, NACK/DTX, any, any), except for (ACK, DTX, DTX, DTX) | ACK, ACK, NACK/DTX, any | $n_{PUCCH,3}^{(1)}$ | 0, 0 | 0, 0, 1, 0 |
| ACK, ACK, ACK, NACK/DTX | ACK, DTX, DTX, DTX | $n_{PUCCH,2}^{(1)}$ | 1, 1 | 1, 1, 0, 1 |
| ACK, ACK, ACK, NACK/DTX | ACK, ACK, ACK, ACK | $n_{PUCCH,2}^{(1)}$ | 1, 1 | 1, 1, 0, 1 |
| ACK, ACK, NACK/DTX, any | ACK, DTX, DTX, DTX | $n_{PUCCH,2}^{(1)}$ | 0, 1 | 1, 0, 0, 1 |
| ACK, ACK, NACK/DTX, any | ACK, ACK, ACK, ACK | $n_{PUCCH,2}^{(1)}$ | 0, 1 | 1, 0, 0, 1 |
| ACK, DTX, DTX, DTX | ACK, DTX, DTX, DTX | $n_{PUCCH,2}^{(1)}$ | 1, 0 | 0, 1, 0, 1 |
| ACK, DTX, DTX, DTX | ACK, ACK, ACK, ACK | $n_{PUCCH,2}^{(1)}$ | 1, 0 | 0, 1, 0, 1 |
| ACK, ACK, ACK, ACK | ACK, DTX, DTX, DTX | $n_{PUCCH,2}^{(1)}$ | 1, 0 | 0, 1, 0, 1 |
| ACK, ACK, ACK, ACK | ACK, ACK, ACK, ACK | $n_{PUCCH,2}^{(1)}$ | 1, 0 | 0, 1, 0, 1 |
| NACK/DTX, any, any, any | ACK, DTX, DTX, DTX | $n_{PUCCH,2}^{(1)}$ | 0, 0 | 0, 0, 0, 1 |
| NACK/DTX, any, any, any | ACK, ACK, ACK, ACK | $n_{PUCCH,2}^{(1)}$ | 0, 0 | 0, 0, 0, 1 |
| (ACK, NACK/DTX, any, any), except for (ACK, DTX, DTX, DTX) | ACK, DTX, DTX, DTX | $n_{PUCCH,2}^{(1)}$ | 0, 0 | 0, 0, 0, 1 |
| (ACK, NACK/DTX, any, any), except for (ACK, DTX, DTX, DTX) | ACK, ACK, ACK, ACK | $n_{PUCCH,2}^{(1)}$ | 0, 0 | 0, 0, 0, 1 |
| ACK, ACK, ACK, NACK/DTX | NACK/DTX, any, any, any | $n_{PUCCH,1}^{(1)}$ | 1, 0 | 1, 1, 0, 0 |
| ACK, ACK, ACK, NACK/DTX | (ACK, NACK/DTX, any, any), except for (ACK, DTX, DTX, DTX) | $n_{PUCCH,1}^{(1)}$ | 1, 0 | 1, 1, 0, 0 |
| ACK, ACK, NACK/DTX, any | NACK/DTX, any, any, any | $n_{PUCCH,1}^{(1)}$ | 0, 1 | 1, 0, 0, 0 |
| ACK, ACK, NACK/DTX, any | (ACK, NACK/DTX, any, any), except for (ACK, DTX, DTX, DTX) | $n_{PUCCH,1}^{(1)}$ | 0, 1 | 1, 0, 0, 0 |
| ACK, DTX, DTX, DTX | NACK/DTX, any, any, any | $n_{PUCCH,0}^{(1)}$ | 1, 1 | 0, 1, 0, 0 |
| ACK, DTX, DTX, DTX | (ACK, NACK/DTX, any, any), except for (ACK, DTX, DTX, DTX) | $n_{PUCCH,0}^{(1)}$ | 1, 1 | 0, 1, 0, 0 |

TABLE 13-continued

| Primary Cell | Secondary Cell | Resource | Constellation | RM Code Input Bits |
|---|---|---|---|---|
| ACK, ACK, ACK, ACK | NACK/DTX, any, any, any | $n_{PUCCH,0}^{(1)}$ | 1, 1 | 0, 1, 0, 0 |
| ACK, ACK, ACK, ACK | (ACK, NACK/DTX, any, any), except for (ACK, DTX, DTX, DTX) | $n_{PUCCH,0}^{(1)}$ | 1, 1 | 0, 1, 0, 0 |
| NACK, any, any, any | NACK/DTX, any, any, any | $n_{PUCCH,0}^{(1)}$ | 0, 0 | 0, 0, 0, 0 |
| NACK, any, any, any | (ACK, NACK/DTX, any, any), except for (ACK, DTX, DTX, DTX) | $n_{PUCCH,0}^{(1)}$ | 0, 0 | 0, 0, 0, 0 |
| (ACK, NACK/DTX, any, any), except for (ACK, DTX, DTX, DTX) | NACK/DTX, any, any, any | $n_{PUCCH,0}^{(1)}$ | 0, 0 | 0, 0, 0, 0 |
| (ACK, NACK/DTX, any, any), except for (ACK, DTX, DTX, DTX) | (ACK, NACK/DTX, any, any), except for (ACK, DTX, DTX, DTX) | $n_{PUCCH,0}^{(1)}$ | 0, 0 | 0, 0, 0, 0 |
| DTX, any, any, any | NACK/DTX, any, any, any | | No Transmission | 0, 0, 0, 0 |
| DTX, any, any, any | (ACK, NACK/DTX, any, any), except for (ACK, DTX, DTX, DTX) | | No Transmission | 0, 0, 0, 0 |

In Table 13, resources may be allocated to the $n^{(1)}_{PUCCH,0}$, $n^{(1)}_{PUCCH,1}$, $n^{(1)}_{PUCCH,2}$ and $n^{(1)}_{PUCCH,3}$ as the example mentioned with reference to Table 11.

Figure 11:
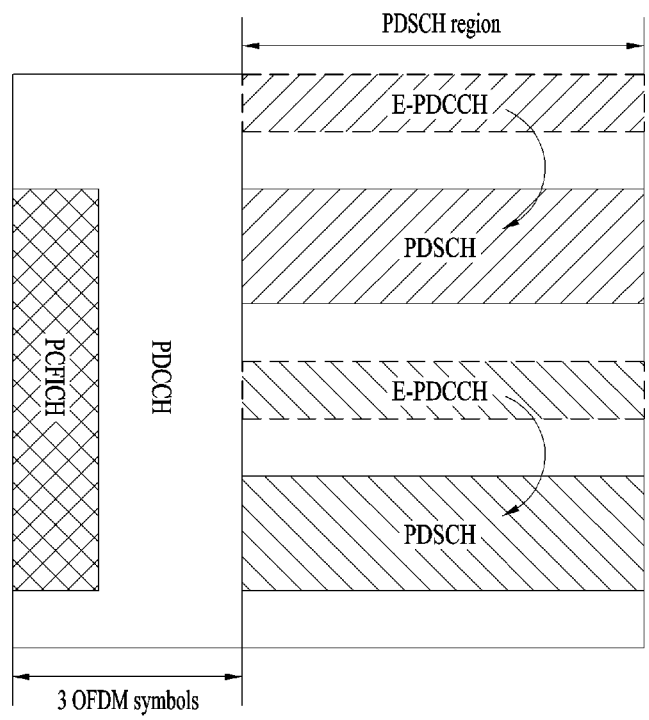
FIG. 11 is a diagram for an example of EPDCCH and PDSCH scheduled by the EPDCCH.

FIG. 11 is a diagram for an example of EPDCCH and PDSCH scheduled by the EPDCCH.

Referring to FIG. 11, EPDCCH may be used in a manner of being defined in a part of a PDSCH region in which data is generally transmitted. A user equipment should perform a blind decoding process for detecting whether EPDCCH of the corresponding user equipment is present. Although the EPDCCH may perform a scheduling operation (i.e., control of PDSCH and PUSCH) identical to that of conventional legacy PDCCH, if the number of user equipments accessing such a node as RRH increases, more EPDCCHS are allocated to the PDSCH region. Therefore, it is disadvantageous in that complexity may increase due to an increase in the number of blind decodings, which should be performed by the user equipment.

CoMP (cooperative multipoint transmission/reception) is explained in the following description.

A system appearing after LTE-A has attempted to introduce a scheme of enhancing system performance by enabling a plurality of cells to cooperate with each other. Such a scheme is called a cooperative multipoint transmission/reception (hereinafter abbreviated CoMP). The CoMP refers to a scheme for two or more base stations, access points, or cells to cooperatively communicate with a specific user equipment for smooth communication between the user equipment and the base stations, the access points, or the cells. In the present invention, a base station, an access point, and a cell may have the same meaning.

In general, in a multi-cell environment having a frequency reuse factor set to 1, performance and average sector throughput of a user equipment located at a cell boundary may be lowered due to inter-cell interference (ICI). In order to reduce the ICI, a conventional LTE system has applied a method of providing an appropriate throughput performance to a user equipment located at a cell boundary in an environment restricted by interference using a simple manual scheme such as FFR (fractional frequency reuse) through UE-specific power control. However, reduction of the ICI or reuse of the ICI as a signal desired by a user equipment may be more preferable than lowering a frequency resource use per cell. In order to achieve the aforementioned purpose, the CoMP transmission scheme can be applied.

Figure 12:
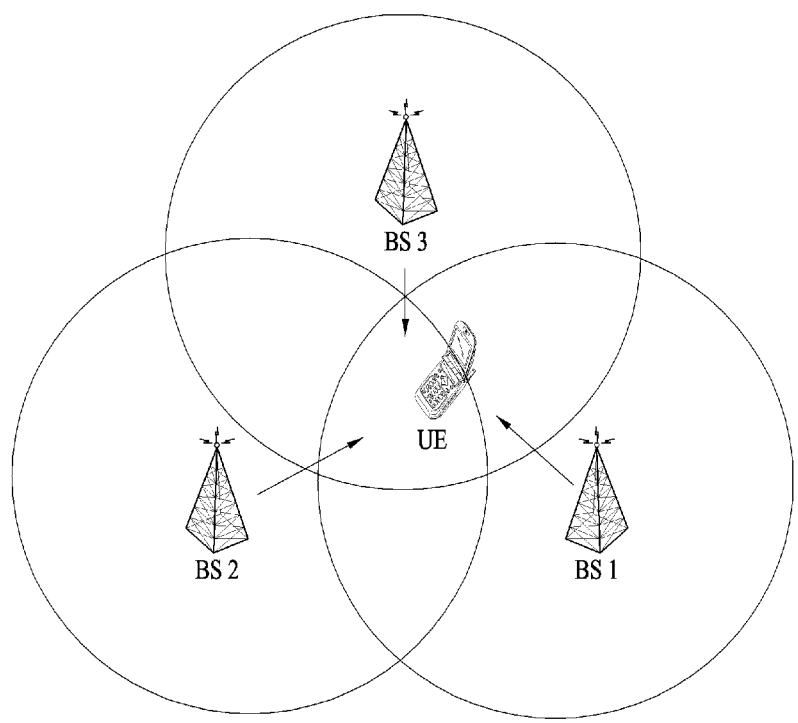
FIG. 12 is a diagram for an example of performing CoMP.

FIG. 12 is a diagram for one example of performing CoMP. Referring to FIG. 12, a wireless communication system includes a plurality of base stations (BS 1, BS 2 and BS 3) performing CoMP and a user equipment. A plurality of the base stations (BS 1, BS 2 and BS 3) performing the CoMP may efficiently transmit data to the user equipment by cooperating with each other. The CoMP may be mainly divided into two schemes according to whether data is transmitted from respective the base stations performing the CoMP:

Joint processing (CoMP joint processing (CoMP-JP))
Cooperative scheduling/beamforming (CoMP cooperative scheduling/beamforming (CoMP-CS/CB))

In case of the CoMP-JP, data is simultaneously transmitted from respective base stations performing the CoMP to one user equipment and the user equipment combines signals from the respective base stations to improve reception performance. In particular, according to the CoMP-JP scheme, each point (e.g., base station) of CoMP cooperation unit may use data. And, the CoMP cooperation unit may mean a set of base stations used for cooperative transmission scheme. Moreover, the JP scheme may be classified into a joint transmission scheme and a dynamic cell selection scheme.

The joint transmission scheme means a scheme of transmitting PDSCH from a plurality of points (portion or all of CoMP cooperation unit) at a time. In particular, data transmitted to a single user equipment may be simultaneously transmitted from a plurality of transmission points. According to the joint transmission scheme, a quality of a received signal may be coherently or non-coherently improved and interference on another user equipment may be actively eliminated as well.

The dynamic cell selection scheme may mean the scheme of transmitting PDSCH from one point (of CoMP cooperation unit) at a time. In particular, data transmitted to a single user equipment at a specific timing is transmitted from one point, the rest of points in the cooperation unit at that timing do not perform data transmission to the corresponding user equipment, and a point of transmitting data to the corresponding user equipment may be dynamically selected.

Meanwhile, in case of the CoMP-CS, data is transmitted from one base station to one user equipment at a random timing and scheduling or beamforming is performed in order to minimize interference caused by other base stations. In particular, according to the CoMP-CS/CB scheme, CoMP cooperation units are able to cooperatively perform beamforming of data transmission to a single user equipment. In this case, although the data is transmitted from a serving cell only, user scheduling/beamforming may be determined by the coordination of cells of the corresponding CoMP cooperation unit.

Meanwhile, in case of uplink, coordinated multi-point reception means that a signal transmitted by coordination of a plurality of points geographically spaced apart from each other is received. CoMP schemes applicable to a case of uplink may be classified into joint reception (JR) and coordinated scheduling/coordinated beamforming (CS/CB).

The JR scheme means that a signal transmitted on PUSCH is received by a plurality of reception points. And, the CS/CB scheme means that user scheduling/beamforming is determined by the coordination of the cells of the CoMP cooperation unit despite that PUSCH is received by one point only.

Interference between a multitude of cells is described in the following.

If a part of coverages of two base stations is overlapped with each other like a case that two base stations (e.g., base station#1 and base station#2) are arranged in a manner of being adjacent to each other, a strong DL signal from one base station may cause interference to a user equipment served by another base station. In case that inter-cell interference is generated, the inter-cell interference can be reduced through an inter-cell cooperation signal scheme between the two base stations. In the various embodiments of the present invention that will be described later, it is assumed that a signal is smoothly transceived between two base stations which interfere in each other. For instance, it is assumed that a wired/wireless link (e.g., backhaul link or Un interface) having satisfactory transmission conditions such as transmission bandwidth, time delay and the like is present between the two base stations so that reliability of transmission and reception of a cooperative signal between two base stations is high. In addition, it is assumed that time synchronization between the two base stations is matched with each other within an allowable error range (e.g., a case that boundaries of downlink subframes of the two base stations interfering in each other are aligned) or a difference (offset) between subframe boundaries of the two base stations is clearly recognized by the two base stations.

Referring back to FIG. 12, a base station#1 (BS#1) may be a macro base station that serves a wide area with high transmission power and a base station#2 (BS#2) may be a micro base station (e.g., pico base station) that serves a narrow area with low transmission power. As shown in FIG. 11, when the base station#1 causes strong interference to a user equipment located at a cell boundary of the base station#2 and served by the base station#2, it may be difficult to perform efficient communication without appropriate inter-cell cooperation.

In particular, when a large number of user equipments are connected to the base station#2 corresponding to the micro base station having low power in order to distribute a load of the base station#1 corresponding to the macro base station providing a service, it is highly probable that the above-mentioned inter-cell interference occurs. For instance, when a user equipment intends to select a serving base station, the user equipment can calculate and compare each of reception powers of DL signals from base stations by adding a prescribed adjustment value (bias value) to reception power from the micro base station and adding no adjustment value to reception power from the macro base station. As a result, the user can select a base station that provides highest DL reception power as the serving base station. Thus, a larger number of user equipments can be connected to the micro base station. Even though strength of the DL signal actually received by the user equipment from the macro base station is much higher than the strength of the DL signal from the micro base station, the micro base station can be selected as the serving base station. And, the macro base station may cause the strong interference to the user equipment connected to the micro base station. In this case, if a separate inter-cell cooperation is not provided, it may be difficult for user equipments located at the boundary of the micro base station to perform correct operations due to the strong interference from the macro base station.

Even if the inter-cell interference exists, appropriate cooperation needs to be achieved between two base stations interfering in each other in order to perform an efficient operation. And, a signal enabling the cooperation can be transceived in a link between the two base stations. In this case, if the inter-cell interference occurs between a macro base station and a micro base station, the macro base station may control inter-cell cooperation and the micro base station may perform an appropriate operation in accordance with a cooperative signal instructed by the macro base station.

The above mentioned inter-cell interference occurrence situation is just exemplary. And, it is apparent that the embodiments of the present invention can be identically applicable to a case of the inter-cell interference generated in a different situation (e.g., a case of the inter-cell interference occurs between a CSG type of HeNB and an OSG type of a macro base station, a case that a micro base station causes the ICI to a macro base station, a case that the ICI is present between micro base stations or between macro base stations, or the like).

Figure 13:
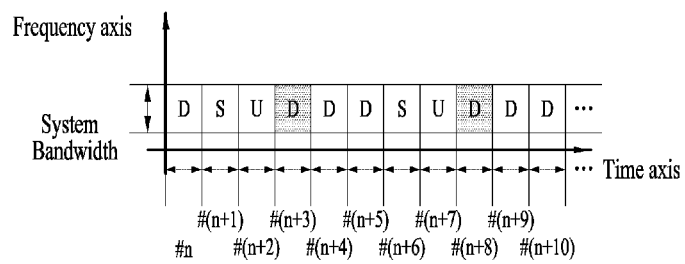
FIG. 13 is a diagram for a case of dynamically changing usage of a radio resource in a TDD system environment.

FIG. 13 is a diagram of an example for a specific cell to change a part of conventional uplink resources (i.e., UL SF) into usage of downlink communication and use the changed usage of the resources in a TDD system environment according to increase in a downlink load of the system.

Referring to FIG. 13, a UL/DL configuration configured through SIB is assumed to be UL/DL#1 (i.e., DSUUDDSUUD). Moreover, assume a case that each of existing UL SF#(n+3) and UL SF#(n+8) is used in a manner of being changed into usage of downlink communication through a predefined signal (e.g., physical/upper layer signal or system information signal).

As mentioned in the foregoing description, the present invention proposes a method for a user equipment to efficiently transmitting acknowledgement/negative-acknowledgement (ACK/NACK) information in response to usage change information (e.g., usage change indicator) of a base station in case that a multitude of cells dynamically change usages of radio resources depending on their system load states.

According to the present invention, the usage change information (e.g., usage change indicator) may be transmitted through PDCCH (physical downlink control channel) and/or at least one selected from the group consisting of i) EPDCCH (enhanced PDCCH), ii) PBCH (physical broadcast channel, for example, MIB), iii) upper layer signal (e.g., RRC, MAC, etc.) and iv) SIB (system information block), transmitted in a PDSCH (physical downlink shared channel) region. In this case, the PDSCH region may be defined as a region constituted with the rest of OFDM symbols except some initial OFDM symbols used for (conventional) PDCCH transmission in a subframe including a multitude of OFDM symbols. Moreover, a case that all OFDM symbols in the corresponding subframe is designated and used as the PDSCH region due to no OFDM symbol used for the PDCCH transmission may be referred to as the PDSCH region to which the present invention can be applied.

For clarity of the explanation, a proposed scheme is explained based on 3GPP LTE system in the following description. However, the scope of the system to which the present invention is applied can be extended to other systems as well as to the 3GPP LTE system.

The embodiments of the present invention can be extensively applied to a case of dynamically changing a resource on a specific cell (or a component carrier (CC)) in an environment, to which carrier aggregation (CA) scheme is applied, depending on a load state of the system as well.

Moreover, the embodiments of the present invention can be extensively applied to a case of dynamically changing usage of a radio resource in a TDD system, a FDD system or a TDD/FDD combination system as well.

In addition, the embodiments of the present invention can be extensively applied to a case that the usage change information (or usage change indicator) is transmitted in at least one form selected from the group consisting of i) UE-specific signal form, ii) cell-specific signal form and iii) UE group-specific signal form. Further, the usage change information (or usage change indicator) may be transmitted through UE-specific search space (USS) and/or common search space (CSS).

Furthermore, ARI (ACK/NACK resource indicator) or ARO (ACK/NACK resource offset) is hereinafter used for usage of indicating a PUCCH resource. For one example, the ARI may be used for usage of informing a resource change value (e.g., offset) for a specific PUCCH resource (group) (configured by an upper layer). For another example, the ARI may be used for usage of informing a specific PUCCH resource (group) index in a PUCCH resource (group) set (configured by an upper layer). The ARI may be included in a TPC (transmit power control) field of PDCCH corresponding to PDSCH on SCC. PUCCH power control is performed through a TPC field in PDCCH (i.e., PDCCH corresponding to PDSCH on PCC) for scheduling PCC. Moreover, the ARI may be included in a TPC field of remaining PDCCHs except PDCCH, which has an initial value of DAI (downlink assignment index), for scheduling a specific cell (e.g., PCell). The ARI is interchangeably used with an HARQ-ACK resource indication value. Particularly, in case of EPDCCH, the ARI may be transmitted by utilizing an ARO field.

For clarity of the explanation, a case that each of cells dynamically changes usage of an existing radio resource in a TDD system environment depending on its system load state is assumed in the following description. Moreover, for clarity of the explanation, acknowledgement/negative-acknowledgement information in response to usage change information (or usage change indicator) transmitted by a user equipment is named 'confirmation message'.

In addition, although the proposed methods are described in the following by being (appropriately) assorted in accordance with PUCCH formats, it is apparent that methods proposed for a specific PUCCH format may be used (or reused) for other PUCCH formats.

1. $1^{st}$ Embodiment

As one embodiment of the present invention, in case that ACK/NACK (UL ACK/NACK) information in response to downlink data (PDSCH) is transmitted based on a channel selection scheme (e.g., PUCCH 1B channel selection (i.e., 2-bit HARQ ACK/NACK with/without SR)), a confirmation message is configured to be transmitted (together with the ACK/NACK information in response to the downlink data) based on methods 1-A to 1-E explained in the following description. In this case, for example, if a user equipment receives usage change information (e.g., usage change indicator) at a random subframe timing (i.e., SF #n) from a base station, it is assumed that the confirmation message in response to the corresponding usage change information is transmitted at a specific subframe timing (i.e., SF #(n+k)) (where k is a positive integer equal to or greater than 4) after the random subframe timing according to a predefined rule (e.g., (downlink) HARQ timeline).

1-A. In case that a confirmation message and UL ACK/NACK information need to be transmitted at a same timing (i.e., SF #(n+k)), a time bundling scheme and/or a spatial bundling scheme may be set to be applied to between the confirmation message and the UL ACK/NACK information. In this case, if the present proposed method (i.e., 1-A) is applied, it is advantageous in that an additional change in the number (hereinafter named M) of downlink subframes interconnected to a specific uplink subframe of a channel selection scheme may not occur. In particular, a value of M in a channel selection scheme selected in case of transmitting the UL ACK/NACK information independently may become equal to that in a channel selection scheme selected in case of simultaneously transmitting the confirmation message and the UL ACK/NACK information based on the time bundling scheme and/or the spatial bundling scheme.

And, the spatial bundling scheme and/or the time bundling scheme may be configured to be applied to the confirmation message and uplink ACK/NACK (hereinafter named UL ACK/NACK) information related to a specific codeword transmitted in a downlink subframe of a predefined specific timing. In this case, the spatial bundling scheme and/or the time bundling scheme may be configured to be applied to the confirmation message and UL ACK/NACK information related an $N^{th}$ (e.g., a value of N may be fixed to 1 (independent from that of K) at all times) codeword on a predefined $K^{th}$ downlink subframe among M downlink subframes interconnected with a specific uplink subframe (i.e., timing at which the confirmation message and the UL ACK/NACK information are simultaneously transmitted) of the channel selection scheme.

Moreover, if transmission of the downlink data (PDSCH) (or transmission of the $N^{th}$ codeword) is not actually performed on the $K^{th}$ downlink subframe in the case of 1-A, the spatial bundling scheme and/or the time bundling scheme may be configured to be applied to the confirmation message and UL ACK/NACK information related an $N^{th}$ codeword on a closest downlink subframe on which the transmission of the downlink data (or transmission of the $N^{th}$ codeword) is actually performed after a $K^{th}$ downlink subframe.

Furthermore, if the transmission of the downlink data (PDSCH) (or the transmission of the $N^{th}$ codeword) is not actually performed on the $K^{th}$ downlink subframe in the case of 1-A, it may be configured that the channel selection scheme is applied after considering the confirmation message as the UL ACK/NACK information in response to the downlink data (or the $N^{th}$ codeword) transmitted in the $K^{th}$ downlink subframe. In this case, if the above-mentioned example and configuration are applied, it is assumed that the downlink data (or the $N^{th}$ codeword) is virtually transmitted in the $K^{th}$ downlink subframe, whereby a value of DL DAI (and/or UL DAI) may be configured to be set (i.e., increased by 1) in consideration of this.

In addition, if a single codeword is transmitted in the $K^{th}$ subframe or in the closest subframe on which the transmission of the downlink data is performed after the $K^{th}$ downlink subframe in the case of 1-A, it may be configured that the spatial bundling scheme and/or the time bundling scheme is exceptionally applied to between the UL ACK/NACK information related the corresponding single codeword and the confirmation message (although it does not match with the predefined $N^{th}$ codeword).

Figure 14:
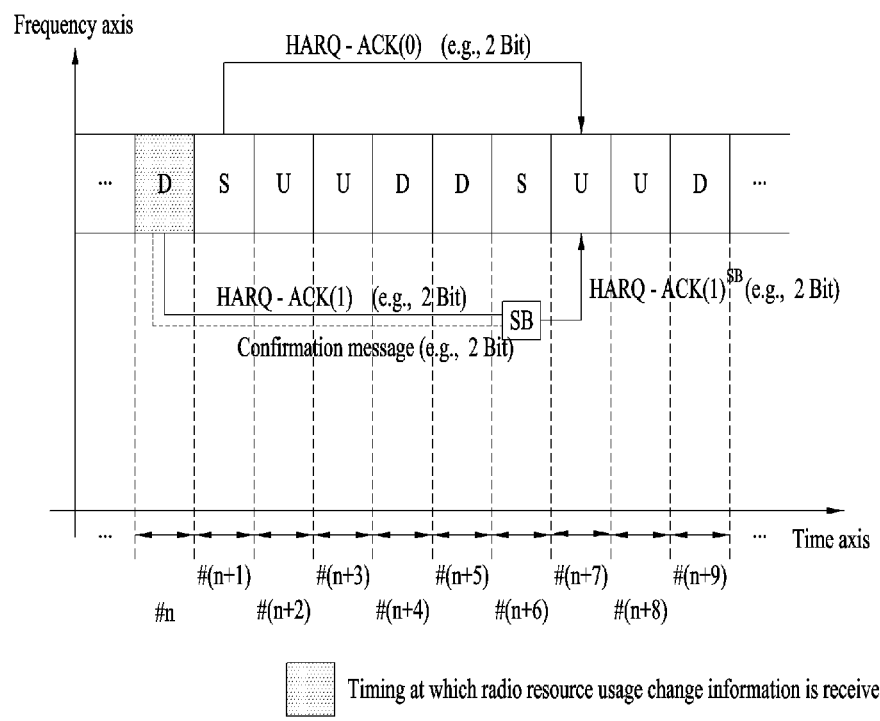
FIG. 14 is a reference diagram to describe a method for a user equipment to transmit information on whether to receive radio resource usage change information to a base station according to one embodiment of the present invention.

FIG. 14 is a reference diagram to describe a $1^{st}$ embodiment of the present invention. In FIG. 14, for example, the number of downlink subframes interconnected with a specific uplink subframe of a channel selection scheme is assumed to be 2. And, assume a case that a single codeword is transmitted in each downlink subframe. Moreover, it is assumed that the spatial bundling (SB) scheme is applied to a confirmation message and UL ACK/NACK information related a $1^{st}$ codeword on a 1 downlink subframe of the two downlink subframes interconnected with the specific subframe of the channel selection scheme.

In FIG. 14, HARQ-ACK(0) information indicates 2-bit UL ACK/NACK information in response to a single codeword transmitted in an SF #(n+1), HARQ-ACK(1) information indicates 2-bit UL ACK/NACK information in response to a single codeword transmitted in an SF #n, and HARQ-ACK(1)$^{SB}$ information means 2-bit ACK/NACK information drawn by applying the spatial bundling scheme to between the HARQ-ACK(1) information and the confirmation message. In a UL SF #(n+7) shown in FIG. 14, a user equipment transmits corresponding information to a base station using uplink resources (matching HARQ-ACK(1)$^{SB}$ information and HARQ-ACK(0) information) on a predefined channel selection scheme table of 'M=2'.

1-B. In case that a confirmation message and UL ACK/NACK information needs to be transmitted at a same timing (i.e., SF #(n+k)), it may be configured that the corresponding confirmation message is considered as UL ACK/NACK information in response to downlink data (PDSCH) transmitted in a downlink subframe of a specific cell (or a component carrier). In this case, the corresponding specific cell may be set to i) a cell in which usage change information (e.g., usage change indicator) is actually received, ii) a predefined random cell (or a virtual cell), iii) one cell among cells on which downlink data transmission is not performed at a timing of receiving usage change information, or iv) a primary cell (PCell).

And, in the example such as 1-B, the confirmation message may be configured to be combined (or multiplexed) with the UL ACK/NACK information in response to the downlink data transmitted in the downlink subframe in the corresponding specific cell by the time bundling scheme and/or the spatial bundling scheme. In this case, the corresponding specific cell may be defined as a different cell instead of a cell in which usage change information is actually received. In this case, the confirmation message is combined (or multiplexed) with ACK/NACK information in response to downlink data transmitted in a downlink subframe of the different cell by the time bundling scheme and/or the spatial bundling scheme.

Moreover, in case that the present proposed method (i.e., 1-B) is applied, a change in the number (i.e., M) of downlink subframes interconnected to the specific uplink subframe of the channel selection scheme may occur. For instance, in case that the channel selection scheme and the preset proposed method (i.e., 1-B) are applied, an uplink resource interconnected to the usage change information should be defined previously. The reason for this is that the channel selection scheme is made to generate M of different UL ACK/NACK information configurations through a combination between positions of uplink resources for transmitting the UL ACK/NACK information and bits transmitted in positions of corresponding uplink resources. Therefore, the uplink resource interconnected to the usage change information needs to be defined in an implicit or explicit method.

As an example of the implicit method, it may be configured that a lowest CCE (or ECCE) index (e.g., initial CCE (or ECCE) index of a $1^{st}$ PDCCH (or EPDCCH)) of PDCCH (or EPDCCH) related to downlink data (PDSCH) (or corresponding usage change information) transmitted in a downlink subframe having the corresponding usage change information received therein is set as an input value and determined as an uplink resource drawn through a predefined function. In this case, if transmission of downlink data (e.g., transmission of usage change information) based on EPDCCH is performed, the uplink resource interconnected to the usage change information may be configured to be determined by (exceptionally) considering an ACK/NACK resource offset (ARO) value together.

As an example of the explicit method, a base station may be configured to previously inform a user equipment of the uplink resource interconnected to the corresponding usage change information through an upper layer signal (or physical layer signal). In this case, the uplink resource interconnected to the corresponding usage change information may be configured to be independently (e.g., differently) defined in each user equipment or each user equipment group.

Furthermore, (exceptionally) in case that downlink data is transmitted in form of a single codeword, the uplink resource interconnected to the usage change information is not additionally defined but the confirmation message may be configured to be transmitted together with the UL ACK/NACK information using only an uplink resource interconnected to a downlink subframe in which the corresponding downlink data is transmitted. In this case, the spatial bundling scheme and/or the time bundling scheme may be configured to be applied to the confirmation message and UL ACK/NACK information related to a ($1^{st}$) codeword on a predefined $K^{th}$ downlink subframe among M downlink subframes interconnected to a specific uplink subframe (i.e., timing at which the confirmation message and the UL ACK/NACK information are transmitted simultaneously) of the channel selection scheme.

In addition, positions of uplink resources in which the confirmation message and the UL ACK/NACK information combined (or multiplexed) with each other by the spatial bundling scheme and/or the time bundling scheme may be determined depending on whether the confirmation message corresponds to ACK information or NACK information. For instance, in case that the confirmation message corresponds to the ACK information, the confirmation message and the UL ACK/NACK information combined (or multiplexed) with each other by the spatial bundling scheme and/or the time bundling scheme may be transmitted i) through uplink resources corresponding to the confirmation message and the UL ACK/NACK information combined (or multiplexed) with each other by the spatial bundling scheme and/or the time bundling scheme on the conventional channel selection scheme table or ii) through uplink resources configured by the above-mentioned implicit method (i.e., in order to define the uplink resource interconnected to the usage change information). On the other hand, in case that the confirmation message corresponds to the NACK information, the confirmation message and the UL ACK/NACK information combined (or multiplexed) with each other by the spatial bundling scheme and/or the time bundling scheme may be configured to be transmitted through uplink resources configured by the above-mentioned explicit method (i.e., in order to define the uplink resource interconnected to the usage change information). In this case, not only ACK/NACK information on reception of the usage change information is understood through the corresponding confirmation message but also the confirmation message and the UL ACK/NACK information combined (or multiplexed) with each other by the spatial bundling scheme and/or the time bundling scheme are doubly understood through positions of transmitted uplink resources. Therefore, it is advantageous in that relatively high reliability of a confirmation message is able to be transmitted.

1-C. UL ACK/NACK information is maximally bundled (i.e., compressed) using the predefined spatial bundling scheme and/or time bundling scheme whereas a confirmation message may be configured to be handled separately.

Moreover, it may be defined that corresponding information is transmitted through uplink resources matching a (state) combination of the confirmation message and (maximally bundled) UL ACK/NACK information on a channel selection scheme table after the above process (i.e., the UL ACK/NACK information is maximally bundled whereas the confirmation message is handled separately).

In this case, as an example of an operation of bundling UL ACK/NACK information maximally, if 2 of UL ACK/NACK information (i.e., HARQ-ACK(0) and HARQ-ACK(1)) are interconnected to a TB 1 primary cell and a TB 1 secondary cell in a FDD system respectively, UL ACK/NACK information for the TB 1 primary cell and the TB 1 secondary cell may be configured to be bundled (i.e., bundling method between cell/component carriers) and mapped (or remapped) to the HARQ-ACK(0) and the confirmation message may be configured to be mapped (or remapped) to the HARQ-ACK(1), according to the predefined configuration.

As another example, if 3 of UL ACK/NACK information (i.e., HARQ-ACK(0), HARQ-ACK(1) and HARQ-ACK(2)) are interconnected to a TB 1 serving cell 1, a TB 2 serving cell 1 and a TB 1 serving cell 2 in the FDD system respectively, UL ACK/NACK information for the TB 1 serving cell 1 and TB 2 serving cell 1 may be configured to be spatial-bundled and mapped (or remapped) to the HARQ-ACK(0), the confirmation message may be configured to be mapped (or remapped) to the HARQ-ACK(1), and UL ACK/NACK information for the TB 1 serving cell 2 may be configured to be mapped to the HARQ-ACK(2), according to the predefined configuration.

As further example, if 4 of UL ACK/NACK information (i.e., HARQ-ACK(0), HARQ-ACK(1), HARQ-ACK(2), and HARQ-ACK(3)) are interconnected to TB 1 primary cell, a TB 2 primary cell, a TB 1 secondary cell, and a TB 2 serving cell in the FDD system respectively, UL ACK/NACK information for the TB 1 primary cell and the TB 2 primary cell may be configured to be spatial-bundled and mapped (or remapped) to the HARQ-ACK(0), the confirmation message may be configured to be mapped (or remapped) to the HARQ-ACK(1), UL ACK/NACK information for the TB 1 secondary cell may be configured to be mapped to the HARQ-ACK(2), and UL ACK/NACK information for the TB 2 secondary cell may be configured to be mapped to the HARQ-ACK(3), according to the predefined configuration. Alternatively, it may be configured that UL ACK/NACK information for the TB 1 primary cell is mapped to the HARQ-ACK(0), UL ACK/NACK information for the TB 2 primary cell is mapped to the HARQ-ACK(1), UL ACK/NACK information for the TB 1 secondary cell and the TB 2 secondary cell is spatial-bundled and mapped (or remapped) to the HARQ-ACK(2), and the confirmation message is mapped (or remapped) to the HARQ-ACK(3).

1-D. In case that a channel selection scheme is applied, a predefined number of PUCCH resources for M of downlink subframes interconnected to a specific uplink subframe are reserved. However, in case that 'M=3' or 'M=4', only some PUCCH resources (e.g., PUCCH resources interconnected to a lowest CCE (or ECCE) index (or a $1^{st}$ CCE (or ECCE) index) in case of a DAI field, which is set to 1 or 2, in a DCI format) among total 4 PUCCH resources are used for transmission of UL ACKNACK information.

According to the present invention, if M is set to a value equal to or greater than 3 in a TDD system, a confirmation message may be configured to be transmitted through a PUCCH resource interconnected to a lowest CCE (or ECCE) index (or a $1^{st}$ CCE (or ECCE) index) in case of a DAI field set to 3 or 4 in a DCI format.

Additionally, in case that M is set to 2 in the TDD system, the time bundling scheme may be configured to be applied to UL ACK/NACK information (e.g., HARQ-ACK(0) and HARQ-ACK(1)) interconnected to 2 downlink subframes. In particular, the UL ACK/NACK information interconnected to the 2 downlink subframes may be time-bundled and mapped (or remapped) to HARQ-ACK(0). In this case, (for example), the confirmation message may be configured to be mapped (or remapped) to HARQ-ACK(1).

2. $2^{nd}$ Embodiment

As a $2^{nd}$ embodiment of the present invention, in case that ACK/NACK (UL ACK/NACK) information in response to downlink data (PDSCH) is transmitted based on a PUCCH format 3 (i.e., multiple ACK/NACK(s) for CA (e.g., up to 20 ACK/NACK bits plus optional SR, in 48 coded bits)), a confirmation message may be configured to be transmitted (together with the UL ACK/NACK information in response to the downlink data) based on methods 2-A to 2-E.

In the following description, the bit number of the UL ACK/NACK information in the PUCCH format 3 is named $O^{ACK}$. Moreover, the sum of the bit number of the UL ACK/NACK information, the bit number of SR information and the bit number of periodic channel state information (CSI) transmitted through the PUCCH format 3 is named $N^{PUCCH\ 3}$. In this case, the maximum bit number of UL ACK/NACK information in a FDD system corresponds to 10 bits and the maximum bit number of UL ACK/NACK information in a TDD system corresponds to 20 bits. And, the bit number of the SR information corresponds to 1 bit.

2-A. A maximum $N^{PUCCH\ 3}$ value (i.e., 'the bit number of UL ACK information+the bit number of SR information+the bit number of periodic channel state information') of the PUCCH format 3 corresponds to 22 bits (e.g., in the TDD system). However, 21 bits (e.g., '20 bits of UL ACK/NACK information+1 bit of SR information' (i.e., 'coding rate=21 bits/48 coded bits=0.4375', TDD system)) of $N^{PUCCH\ 3}$ value of the PUCCH format 3 is generally used, whereby extra 1 bit remains.

Thus, in case that the confirmation message and the UL ACK/NACK information need to be transmitted at a same timing, the confirmation message may be configured to be transmitted using the corresponding extra 1 bit. If the confirmation message is transmitted using the corresponding extra 1 bit, a final coding rate may have a high value as 0.4583 (i.e., 22 bits/48 coded bits). However, it may not cause a serious problem in aspect of performance.

Moreover, method 2-A may be configured to be limitedly applied to a case that the UL ACK/NACK information and the periodic channel state information are configured not to be simultaneously transmitted through the PUCCH format 3 or a case that the $N^{PUCCH\ 3}$ value of the PUCCH format 3 is included in a predefined range (e.g., $11 < N^{PUCCH\ 3} \le 22$).

2-B. It may be configured that a confirmation message is considered as UL ACK/NACK information in response to downlink data transmitted in a downlink subframe of a specific cell (or component carrier) and the predefined bit number (e.g., 2 bits) of the confirmation message is included in the bit number (i.e., $O^{ACK}$) of the UL ACK/NACK information of the PUCCH format 3. In this case, if method 2-B is applied, the final bit number (i.e., $O^{ACK}$) of the UL ACK/NACK information of the PUCCH format 3 is changed into 'the bit number of UL ACK/NACK information+the bit number of confirmation message (e.g., 2 bits)'.

Moreover, the method 2-B may be configured to be limitedly applied to a case that the UL ACK/NACK information and the periodic channel state information are configured not to be simultaneously transmitted through the PUCCH format 3 or a case that the $N^{PUCCH\ 3}$ value of the PUCCH format 3 is included in a predefined range (e.g., $N^{PUCCH\ 3} \le 11$).

Furthermore, in case that the confirmation message needs to be transmitted, the spatial bundling scheme and/or the time bundling scheme may be configured to be applied to UL ACK/NACK information related to an $N^{th}$ codeword transmitted in a $K^{th}$ downlink subframe of a predefined specific cell. Alternatively, if the confirmation message needs to be transmitted, the spatial bundling scheme and/or the time bundling scheme may be configured to be applied to the UL ACK/NACK information related to the $N^{th}$ codeword transmitted in the $K^{th}$ downlink subframe of the predefined specific cell as mentioned in the foregoing description, after considering the bit number (i.e., $O^{ACK}$) of the UL ACK/NACK information of the PUCCH format 3 greater than a predefined threshold value (e.g., 20 bits).

2-C. In general, if UL ACK/NACK information and periodic channel state information is configured to be simultaneously transmitted in the PUCCH format 3, while the $N^{PUCCH\ 3}$ value (i.e. 'the bit number of UL ACK/NACK information+the bit number of SR information+the bit number of periodic channel state information') is greater than a predefined threshold value (e.g., 22 bits), corresponding periodic channel state information is defined to be dropped.

According to the present invention, in an operation of dropping the periodic channel state information, the predefined bit number of the confirmation message may be configured not to be considered or to be considered. For instance, if the bit number of the confirmation message is not considered, it may be configured to be limitedly applied to only a case that the spatial bundling scheme and/or the time bundling scheme is applied to the confirmation message and UL ACK/NACK information related to the $N^{th}$ codeword transmitted in the $K^{th}$ downlink subframe of the predefined specific cell (after considering the bit number (i.e., $O^{ACK}$) of the UL ACK/NACK information of the PUCCH format 3 greater than the predefined threshold value (e.g., 20 bits)).

2-D. Generally, a predefined number (e.g., 4) of PUCCH resources are defined in the PUCCH format 3 through an upper layer signal in order to transmit UL ACK/NACK information. Thus, according to the present invention, a predefined number of PUCCH resources are divided into two sets. And, the UL ACK/NACK information may be configured to be transmitted through PUCCH resource included in a specific set depending on whether usage change information is successfully received.

For one example, predefined 4 PUCCH resources (e.g., $n_{PUCCH(0)}$, $n_{PUCCH(1)}$, $n_{PUCCH(2)}$, and $n_{PUCCH(3)}$) may be divided into two sets, i.e., a set (e.g., $n_{PUCCH(0)}$ and $n_{PUCCH(1)}$) used in case that the usage change information is successfully received and a set (e.g., $n_{PUCCH(2)}$ and $n_{PUCCH(3)}$) used in case that the usage change information is not successfully received. After dividing, if the usage change information is successfully received and an ACK/NACK resource indicator (ARI) field is designated as '00' (or the ARI field is designated as '01'), the UL ACK/NACK information may be configured to be transmitted through the $n_{PUCCH(0)}$ (or $n_{PUCCH(1)}$). On the other hand, if the usage change information is not successfully received and the ARI field is designated as '00' (or '01'), the UL ACK/NACK information may be configured to be transmitted through the $n_{PUCCH(2)}$ (or $n_{PUCCH(3)}$).

For another example, it may be configured that a predefined number of PUCCH resource sets, which are independently used depending on whether usage change information is successfully received, are defined. For instance, it is assumed that a PUCCH resource set (e.g., $n_{PUCCH(0)}$, $n_{PUCCH(1)}$, $n_{PUCCH(2)}$, and $n_{PUCCH(3)}$) used in case of receiving the usage change information successfully and a PUCCH resource set (e.g., $n_{PUCCH(4)}$, $n_{PUCCH(5)}$, $n_{PUCCH(6)}$, and $n_{PUCCH(7)}$) are defined. On the above assumption, if the usage change information is successfully received and the ARI field is designated as '00' (or '01', '10', '11'), the UL ACK/NACK information may be configured to be transmitted through the $n_{PUCCH(0)}$ (or $n_{PUCCH(1)}$, $n_{PUCCH(2)}$, $n_{PUCCH(3)}$). On the other hand, if the usage change information is not successfully received and the ARI field is designated as '00' (or '01', '10', '11'), the UL ACK/NACK information may be configured to be transmitted through the $n_{PUCCH(4)}$ (or $n_{PUCCH(5)}$, $n_{PUCCH(6)}$, $n_{PUCCH(7)}$).

In the above example (i.e., method 2-D), (a predefined number of) PUCCH resources may be configured to be independently (e.g., differently) defined in each user equipment or each user equipment group.

2-E. In the PUCCH format 3, the confirmation message may be configured to be transmitted in form of RS modulated (RS modulation) in an $N^{th}$ DM-RS on each slot. In this case, (for instance), the confirmation message may be configured to be transmitted in form of RS modulated (RS modulation) in a $2^{nd}$ DM-RS on each slot in the PUCCH format 3. Moreover, method 2-E may be configured to be limitedly applied to only a case that normal CP is configured.

3. $3^{rd}$ Embodiment

As a $3^{rd}$ embodiment of the present invention, in case that ACK/NACK (UL ACK/NACK) information in response to downlink data (PDSCH) is transmitted through an uplink data channel (PUSCH), the confirmation message may be configured to be transmitted (together with the ACK/NACK information in response to the downlink data) based on the following methods. According to a specific UL-DL configuration (e.g., UL-DL configurations #1 to #6) in a TDD system, a UL DAI field (i.e., 2 bits) of DCI format 0/4 is activated. In this case, the UL DAI field means the number of downlink subframes, on which transmission of downlink data is actually performed, among downlink subframe interconnected to a specific uplink subframe. And, a base station and a user equipment may confirm (or reconfirm) an amount of UL ACK/NACK information transmitted through the PUDSCH using the corresponding UL DAI field.

3-A. The confirmation message is considered as UL ACK/NACK information in response to downlink data transmitted in a downlink subframe of a specific cell (or component carrier) and a value of the UL DAI field may be configured in a manner of reflecting the above consideration. In this case, if method 3-A is applied, a final value of the UL DAI field is changed into 'the number of downlink subframes on which transmission of downlink data is actually performed among downlink subframes interconnected to the specific uplink subframe+1 (i.e., confirmation message)'.

3-B. In a situation that transmission of UL ACK/NACK information is performed through PUCCH based on the channel selection scheme, a case that the UL ACK/NACK information should be transmitted through PUSCH due to simultaneous transmission of PUCCH and PUSCH may occur. In particular, it may occur in a case that the simultaneous transmission of the PUCCH and the PUSCH is not configured or in a case that a user equipment does not have capability of supporting the simultaneous transmission of the PUCCH and the PUSCH.

According to the present invention, after the UL DAI field value is determined in a manner of considering the confirmation message as the UL ACK/NACK information in response to the downlink data transmitted in the downlink subframe of the specific cell (or component carrier), 'RM code input bit(s)' information corresponding to ACK/NACK state information (e.g., HARQ-ACK(0), . . . , HARQ-ACK (UL DAI field value−2), HARQ-ACK(UL DAI field value−1)) of the corresponding UL DAI field value may be configured to be finally selected.

For example, in case that the UL DAI field value reflecting the confirmation message is greater than a predefined threshold value (e.g., 4), the time bundling scheme and/or the spatial bundling scheme may be configured to be applied to the corresponding confirmation message and UL ACK/NACK information related to an $N^{th}$ codeword transmitted in a $K^{th}$ downlink subframe of a predefined specific cell. In particular, the UL DAI filed value may be limited not to be greater than the predefined threshold value through the above process.

3-C. In case that the confirmation message is transmitted through PUSCH, the corresponding confirmation message may be configured to be mapped to PUSCH according to a predefined priority after being considered as a kind of control information/data information.

For instance, the priority may be defined in order of i) '(confirmation message)→RI information→CQI/PMI information→data information→UL ACK/NACK information', ii) 'RI information→(confirmation message)→CQI/PMI information→data information→UL ACK/NACK information', iii) 'RI information→CQI/PMI information→(confirmation message)→data information→UL ACK/NACK information', iv) 'RI information→CQI/PMI information→data information→(confirmation message)→UL ACK/NACK information' or v) 'RI information→CQI/PMI information→data information→UL ACK/NACK information→ (confirmation message)'. In particular, the priority of the confirmation message may be implemented as various forms of being inserted at a specific position on 'RI information→CQI/PMI information→data information→UL ACK/NACK information' (in this case, 'A→B' means that A is mapped to on PUSCH and B is then mapped to on the corresponding PUSCH). In the example iii) of method 3-C, the RI information and the UL ACK/NACK information is mapped to fixed positions (OFDM symbol) on predefined PUSCH, the confirmation message may be configured to be continuously mapped (i.e., mapped before performing data information mapping) to positions beyond a position at which CQI/PMI information is mapped.

According to the embodiments (i.e., $1^{st}$ to $3^{rd}$ embodiments) of the present invention, ACK/NACK information in response to usage change information (e.g., usage change indicator) of a base station may be configured to be implicitly understood through an uplink resource position for transmitting i) UL ACK/NACK information in response to downlink data (PDSCH) (without an additional confirmation message of a user equipment) or ii) UL ACK/NACK information combined (or multiplexed) by the spatial bundling scheme and/or the time bundling scheme. In this case, the base station may inform the user equipment of an additional uplink resource (i.e., resource used to implicitly understand whether the usage change information is successfully received) through an upper layer signal/physical layer signal. Moreover, the corresponding additional uplink resource may be configured to be independently (e.g., differently) defined in each user equipment or each user equipment group.

As a particular example, in case that usage change information is successfully received, UL ACK/NACK information in response to downlink data (PDSCH) transmitted in a downlink subframe having the corresponding usage change information received therein may be configured to be transmitted through an uplink resource drawn by a predefined function having a lowest CCE (or ECCE) index (or an initial CCE (or ECCE) index of $1^{st}$ PDCCH (or EPDCCH)) of PDCCH (or EPDCCH) related to the corresponding downlink data (or the corresponding usage change information) as an input value. Alternatively, in case that usage change information is successfully received, UL ACK/NACK information, which is combined (or multiplexed) by the spatial bundling scheme and/or the time bundling scheme, transmitted in a downlink subframe having the corresponding usage change information received therein may be configured to be transmitted through an uplink resource matching UL ACK/NACK information, which is combined (or multiplexed) by the spatial bundling scheme and/or the time bundling scheme, drawn by a predefined function having a lowest CCE (or ECCE) index (or an initial CCE (or ECCE) index of $1^{st}$ PDCCH (or EPDCCH)) of PDCCH (or EPDCCH) related to the corresponding downlink data (or the corresponding usage change information) as an input value.

As mentioned in the foregoing description, if the transmission of the downlink data (or the transmission of the usage change information) based on EPDCCH is performed, it may be configured that an uplink resource related to UL ACK/NACK transmission is determined in a manner of considering even an ARO value (exceptionally).

On the other hand, in case that usage change information is not successfully received, i) UL ACK/NACK information in response to downlink data (PDSCH) or ii) UL ACK/NACK information combined (or multiplexed) by the spatial bundling scheme and/or the time bundling scheme, transmitted in a downlink subframe having corresponding usage change information received therein, may be configured to be transmitted through an uplink resource additionally set through the above-mentioned upper layer signal/physical layer signal.

Moreover, according to the embodiments of the present invention, ACK/NACK information in response to usage change information (e.g., usage change indicator) may be configured to be (implicitly) understood in a manner of applying a preset logical operation to between UL ACK/NACK information of downlink subframes interconnected to a specific uplink frame and/or DTX information and the ACK/NACK information in response to the usage change information. In this case, the corresponding logical operation may be defined as 'AND', 'XOR', or 'OR'.

As a particular example, described is a case that each state of 3 downlink subframes interconnected to a specific uplink subframe corresponds to '(NACK, ACK, ACK)=(0, 1, 1)' and a logical operation 'AND' is predefined. If a user equipment successfully receives usage change information, each state of the 3 downlink subframes interconnected to the specific uplink subframe becomes '((ACK) AND (NACK, ACK, ACK))=(0, 1, 1)'. If the user equipments fails in receiving the usage change information successfully, each state of the 3 downlink subframes interconnected to the specific uplink subframe becomes '((NACK) AND (NACK, ACK, ACK))=(0, 0, 0)'. The user equipment transmits final ACK/NACK information drawn through the logical operation through an uplink resource based on a predefined configuration. And, a base station may understand information on whether the user equipment successfully receives the usage change information (i.e., if at least one of ACK information is received, it is considered that the user equipment successfully receives the usage change information) based on the corresponding final ACK/NACK information transmitted from the user equipment.

Moreover, in the above-mentioned example, if the user equipment fails in receiving the usage change information successfully, each state of the 3 downlink subframes interconnected to the specific uplink subframe is considered as (NACK, NACK, NACK) (or (DTX, DTX, DTX)). And, information such as 'information on whether to receive the corresponding usage change information' may be configured to be transmitted through an uplink resource interconnected with the corresponding state.

In the above-mentioned embodiments of the present invention, if a confirmation message transmission timing and UL ACK/NACK information transmission timing overlaps with each other, it may be configured that corresponding information is transmitted through a predefined uplink resource (e.g., PUCCH, PUSCH, etc.). In this case, a base station may previously inform a user equipment of the uplink resource used for the above purpose through an upper layer signal/physical layer signal.

If a plurality of uplink resource are configured in the above example, the base station may inform the user equipment of information on that which uplink resource is used at a specific timing through a specific field (or ARI field, ARO field) of a predefined DCI format.

A timing at which the corresponding information (i.e., information on that which uplink resource is used) is transmitted/received may be defined as a downlink subframe in which the usage change information is transmitted/received. Moreover, it may be configured that the predefined spatial bundling scheme and/or the time bundling scheme is applied to between a confirmation message transmitted through the corresponding uplink resource and UL ACK/NACK information.

As an embodiment of the present invention, in case that a confirmation message and UL ACK/NACK information need to be simultaneously transmitted, a predefined specific PUCCH format may be configured to be used. In this case, the base station may previously inform the user equipment of information on whether to apply a configuration of the corresponding specific PUCCH format and/or information on that which PUCCH format is used and/or the like through an upper layer signal or a physical layer signal.

And, in the above-mentioned embodiments of the present invention, the confirmation message may be configured to be transmitted through a predefined uplink resource independent (e.g., different) from an uplink resource (e.g., PUCCH, PUSCH, etc.) used for UL ACK/NACK information transmission. In this case, the base station may previously inform the user equipment of configuration information on the uplink resource used for confirmation message transmission through the upper layer signal or the physical layer signal.

Moreover, in the above-mentioned embodiments of the present invention, the bit number of the confirmation message may be configured to be equal to that of UL ACK/NACK of a predefined PUCCH format. Alternatively, the base station may configure the bit number of the confirmation message independently (from the bit number of the UL ACK/NACK) for the user equipment through the upper layer signal or the physical layer signal.

Furthermore, in the above-mentioned embodiments of the present invention, in case that the usage change information (e.g., usage change indicator) is not successfully received, the user equipment and the base station may be configured to consider (or assume) the corresponding case as a predefined NACK/DTX state. For instance, a configuration of considering it as the predefined NACK state is efficient in case that the usage change information (e.g., usage change indicator) is periodically transmitted based on a predefined period value. In this case, the base station may previously inform the user equipment of information related to the above configuration through the upper layer signal or the physical layer signal.

In addition, the above-mentioned embodiments of the present invention may be configured to be limitedly applied to not only a case that the usage change information (e.g., usage change indicator) is periodically transmitted based on the preset periodic value but also a case that the usage change information (e.g., usage change indicator) is aperiodically transmitted.

Since each of the embodiments of the present invention may be included as one of implementing methods of the present invention as well, it is apparent that each of the above-mentioned embodiments of the present invention is considered as a kind of proposed scheme. It may be able to implement the above-mentioned embodiments not only independently but also as form of combining (or merging) the above-mentioned embodiments together in part. Moreover, in the above-mentioned embodiments, methods applied to a specific PUCCH format can be extensively applied to other PUCCH formats.

Further, the base station may inform the user equipment information on the configurations related to the embodiments of the present invention, information on whether to apply the corresponding configurations, or the like through the predefined signal (e.g., physical layer or upper layer signal).

The above-mentioned embodiments of the present invention can be extensively applied to a case that UL ACK/NACK transmission/confirmation message transmission based on other PUCCH formats (e.g., PUCCH format 1/1a/1b/2/2a/2b/3) is performed.

Moreover, the above-mentioned embodiments of the present invention may be configured to be limitedly applied to a case that i) a specific UL-DL configuration is applied and/or ii) a specific CP configuration/specific special subframe configuration is applied and/or iii) data transmission based on EPDCCH (or PDCCH) is performed and/or iv) dynamical change of radio resource usage is configured and/or v) a specific transmission mode (TM) is configured and/or vi) simultaneous transmission of PUCCH and PUSCH is configured (or, simultaneous transmission of PUCCH and PUSCH is not configured or not supported).

Figure 15:
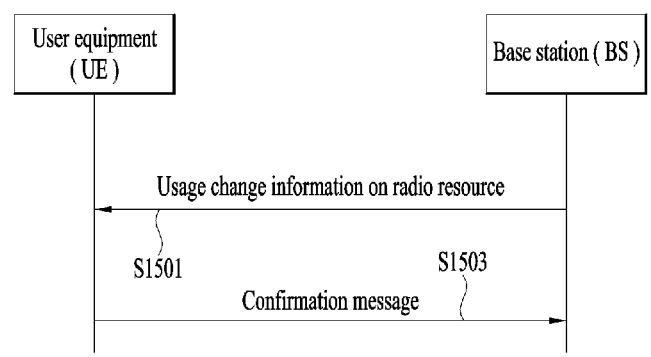
FIG. 15 is a diagram of a method of transmitting and receiving signals according to a preferable embodiment of the present invention.

FIG. 15 is a diagram of a method of transmitting and receiving signals according to a preferable embodiment of the present invention.

Referring to FIG. 15, a user equipment (UE) receives usage change information on a radio resource, for example, a usage change indicator or downlink information related a reconfiguration of a radio resource from a base station (BS) [S1501].

After receiving the usage change information, the user equipment transmits a confirmation message to inform success or failure in reception of the usage change information [S1503]. In particular, in the step S1503 of FIG. 15, the base station may receive from the user equipment information related to whether the usage change information on the radio resource is transceived according to the above-mentioned embodiment of the present invention. In the step S1503, information/configuration/rule or the like related the confirmation message may be configured according to the above-mentioned embodiments of the present invention or determined by a combination of at least a portion of the above-mentioned embodiments of the present invention in some cases.

In the signal transceiving method of the present invention described with reference to FIG. 15, matters described in the various embodiment of the present invention can be independently applied or at least two embodiments can be simultaneously applied. For clarity, redundant contents shall be omitted.

Figure 16:
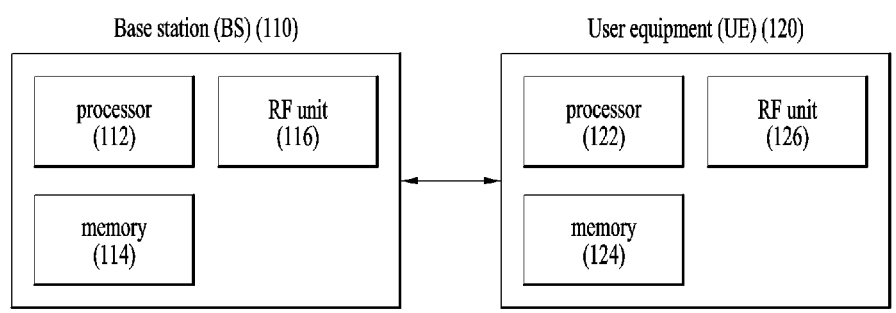
FIG. 16 a diagram for an example of a base station and a user equipment applicable to an embodiment of the present invention.

FIG. 16 is a diagram for an example of a base station and a user equipment applicable to an embodiment of the present invention. If a relay node is included in a wireless communication system, a communication in backhaul link is performed between a base station and the relay node and a communication in access link is performed between the relay node and a user equipment. Therefore, the base station or user equipment shown in the drawing can be substituted with the relay node in some cases.

Referring to FIG. 16, a wireless communication system includes a base station BS 110 and a user equipment UE 120. The base station 110 includes a processor 112, a memory 114 and an RF (radio frequency) unit 116. The processor 112 can be configured to implement the procedures and/or methods proposed by the present invention. The memory 114 is connected to the processor 112 and stores various kinds of informations related to operations of the processor 112. The RF unit 116 is connected to the processor 112 and transmits and/or receives radio or wireless signals. The user equipment 120 includes a processor 122, a memory 124 and an RF unit 126. The processor 122 can be configured to implement the procedures and/or methods proposed by the present invention. The memory 124 is connected to the processor 122 and stores various kinds of informations related to operations of the processor 122. The RF unit 126 is connected to the processor 122 and transmits and/or receives radio or wireless signals. The base station 110 and/or the user equipment 120 can have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

Embodiments of the present invention may be implemented using various means. For instance, embodiments of the present invention may be implemented using hardware, firmware, software and/or any combinations thereof. In case of the implementation by hardware, one embodiment of the present invention may be implemented by one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then drivable by a processor. The memory unit may be provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method for transmitting and receiving signals in a wireless communication and apparatus therefor are mainly described with reference to the examples of applying to 3GPP LTE system, as mentioned in the foregoing description, the present invention is applicable to various kinds of wireless communication systems as well as to the 3GPP LTE system.

What is claimed is:

1. A method of transmitting and receiving signals by a user equipment in a wireless communication system, the method comprising:
    receiving reconfiguration downlink control information (DCI) in a subframe 0 among subframes in a radio frame and receiving downlink data in the subframes including the subframe 0,
    wherein the reconfiguration DCI includes information on a usage change of a radio resource;
    transmitting, through a first uplink resource in the radio frame, acknowledgement/negative acknowledgement (ACK/NACK) information on a success or failure in receiving the downlink data in the subframe 0 included in the subframes if the reconfiguration DCI is successfully received in the subframe 0; and
    transmitting, through a second uplink resource different from the first uplink resource in the radio frame, the ACK/NACK information on the success or failure in receiving the downlink data in the subframe 0 included in the subframes if the reconfiguration DCI is not successfully received in the subframe 0;

wherein the first uplink resource is determined based on a lowest control channel element (CCE) index of a downlink control channel related to the downlink data received in the subframe 0, and wherein the second uplink resource is determined based on upper layer signaling;

wherein a confirmation message including information on a indicating success or failure in receiving the reconfiguration DCI is transmitted through an uplink resource in which the ACK/NACK information is transmitted, wherein the confirmation message is transmitted by being bundled with the ACK/NACK information on the indicating success or failure in receiving the downlink data received in the subframe 0, and wherein the first uplink resource is determined based on using a channel selection scheme table based on the bundled ACK/NACK information with the confirmation message, and wherein the second uplink resource is determined based on upper layer signaling.

2. The method of claim 1, wherein a confirmation message including information on a success or failure in receiving the reconfiguration DCI is implicitly informed to a base station by whether the ACK/NACK information is transmitted through the first uplink resource or the second uplink resource.

3. The method of claim 2, wherein each of the ACK/NACK information for the downlink data received in each of the subframes applies a logical operation with 1 if the confirmation message is successfully received and with 0 if the confirmation message is not successfully received.

4. The method of claim 1, wherein 4 number of physical uplink control channel (PUCCH) resources for transmitting the ACK/NACK information are determined based on an upper layer signaling, wherein a first PUCCH resource among the 4 number of PUCCH resources is used when the reconfiguration DCI is successfully received and an ACK/NACK resource indicator (ARI) field is '00', wherein a second PUCCH resource among the 4 number of PUCCH resources is used when the reconfiguration DCI is successfully received and the ARI field is '01', wherein a third PUCCH resource among the 4 number of PUCCH resources is used when the reconfiguration DCI is not successfully received and the ARI field is '00', wherein a fourth PUCCH resource among the 4 number of PUCCH resources is used when the reconfiguration DCI is not successfully received and the ARI field is '01', and wherein the first uplink resource corresponds to the first PUCCH resource and the second PUCCH resource, and the second uplink resource corresponds to the third PUCCH resource and the fourth PUCCH resource.

5. The method of claim 1, wherein the ACK/NACK information is transmitted through a physical uplink shared channel (PUSCH).

6. A user equipment, which transmits and receives signals in a wireless communication system, the user equipment comprising:

a transceiver; and a processor, wherein the processor controls the transceiver to:

receive reconfiguration downlink control information (DCI) in a subframe 0 among subframes in a radio frame and receive downlink data in the subframes including the subframe 0, wherein the reconfiguration DCI includes information on a usage change of a radio resource, and transmit, through a first uplink resource, acknowledgement/negative acknowledgement (ACK/NACK) information on a success or failure in receiving the downlink data in the subframe 0 included in the subframes if the reconfiguration DCI is successfully received in the subframe 0, and transmit, through a second uplink resource different from the first uplink resource, the ACK/NACK information on the success or failure in receiving the downlink data in the subframe 0 included in the subframes if the reconfiguration DCI is not successfully received in the subframe 0;

wherein the first uplink resource is determined based on a lowest control channel element (CCE) index of a downlink control channel related to the downlink data received in the subframe 0, and wherein the second uplink resource is determined based on upper layer signaling;

wherein a confirmation message including information on a indicating success or failure in receiving the reconfiguration DCI is transmitted through an uplink resource in which the ACK/NACK information is transmitted, wherein the confirmation message is transmitted by being bundled with the ACK/NACK information on the indicating success or failure in receiving the downlink data received in the subframe 0, and wherein the first uplink resource is determined based on using a channel selection scheme table based on the bundled ACK/NACK information with the confirmation message, and wherein the second uplink resource is determined based on upper layer signaling.

* * * * *